US012614231B2

(12) United States Patent
Glass et al.

(10) Patent No.:  US 12,614,231 B2
(45) Date of Patent:       Apr. 28, 2026

(54) SYSTEMS AND METHODS FOR DERIVING SYNTHETIC ASSETS AND ATOMIC TRANSACTION PROCESSING FOR THE SAME

(71) Applicant: BGC PARTNERS, L.P., New York, NY (US)

(72) Inventors: Nicholas Glass, Chatham, NJ (US); Bijoy Paul, New York, NJ (US); Dmitriy Gurvich, Brooklyn, NY (US)

(73) Assignee: BGC PARTNERS, L.P., New York, NY (US)

( * ) Notice:   Subject to any disclaimer, the term of this patent is extended or adjusted under 35 U.S.C. 154(b) by 39 days.

(21) Appl. No.: 18/595,577

(22) Filed:     Mar. 5, 2024

(65)            Prior Publication Data
      US 2024/0249357 A1      Jul. 25, 2024

Related U.S. Application Data

(63) Continuation       of      application      No. PCT/US2022/079315, filed on Nov. 4, 2022.

(51) Int. Cl.
      *G06Q 40/00*         (2023.01)
      *G06Q 40/04*         (2012.01)
(52) U.S. Cl.
      CPC .................................. *G06Q 40/04* (2013.01)
(58) Field of Classification Search
      None
      See application file for complete search history.

(56)              References Cited

U.S. PATENT DOCUMENTS 7,039,610  B2    5/2006   Morano et al.
      7,260,554  B2    8/2007   Morano et al.
      7,742,976  B1    6/2010   Burns et al.
      7,805,360  B2    9/2010   Sundaram et al.
      8,165,951  B2    4/2012   Morano et al.
      8,229,835  B2    7/2012   Milne et al.
      8,266,030  B2    9/2012   Milne et al.
      8,401,955  B2    3/2013   Bauerschmidt et al.
      8,417,618  B2    4/2013   Milne et al.
                       (Continued)

FOREIGN PATENT DOCUMENTS

WO          2021066709         4/2021
      WO     WO-2021066709 A1 *    4/2021    ............. G06Q 20/10

OTHER PUBLICATIONS

PCT International Search Report and Written Opinion mailed Mar. 27, 2023 corresponding to PCT Application No. PCT/US22/79315 filed Nov. 4, 2022 (27 pages).

*Primary Examiner* — Olabode Akintola

(57)              ABSTRACT

An exchange system is disclosed that implements a combo order protocol that allows for combo orders to be provisioned across a plurality distributed ME instances. The plurality of distributed ME instances of the exchange system can maintain an order book for an associated asset when in a "normal" state, and can be configured to transition from the normal state to a combo order transaction state to execute a leg of a provisioned combo order in concert with the other associated ME instances, and in an atomic manner that both guarantees zero price "slippage" for the combo order and that minimizes or otherwise reduces the potential for introducing processing latencies (e.g., due to order book locking by distributed ME instances).

29 Claims, 19 Drawing Sheets

*100*

(56)          References Cited

U.S. PATENT DOCUMENTS

| | | | |
|---|---|---|---|
| 8,442,904 B2 | 5/2013 | Milne et al. | |
| 8,595,119 B2 | 11/2013 | Milne | |
| 10,529,020 B2 | 1/2020 | Acuna-Rohter et al. | |
| 10,572,937 B2 | 2/2020 | Siddall et al. | |
| 11,042,935 B2 | 6/2021 | Co et al. | |
| 11,205,224 B2 | 12/2021 | Bixby et al. | |
| 2005/0203826 A1 | 9/2005 | Farrell et al. | |
| 2006/0190386 A1* | 8/2006 | Levy ..................... | G06Q 40/00 705/37 |
| 2008/0243675 A1 | 10/2008 | Parsons et al. | |
| 2009/0271308 A1* | 10/2009 | Maynard ................ | G06Q 40/00 705/37 |
| 2010/0017321 A1 | 1/2010 | Callaway et al. | |
| 2012/0158569 A1 | 6/2012 | Morano et al. | |
| 2013/0317970 A1* | 11/2013 | Monroe ................ | G06Q 40/04 705/37 |
| 2014/0032388 A1 | 1/2014 | Milne et al. | |
| 2014/0195410 A1* | 7/2014 | Patel ..................... | G06Q 40/04 705/37 |
| 2019/0325519 A1 | 10/2019 | Milne et al. | |
| 2019/0385222 A1 | 12/2019 | Acuna-Rohter et al. | |
| 2020/0104933 A1 | 4/2020 | Acuña-Rohter et al. | |
| 2020/0167867 A1 | 5/2020 | Siddall et al. | |
| 2020/0175594 A1 | 6/2020 | Weng et al. | |
| 2020/0211111 A1* | 7/2020 | Co ..................... | G06Q 20/3678 |
| 2020/0396065 A1* | 12/2020 | Gutierrez-Sheris ..... | H04L 12/46 |

* cited by examiner

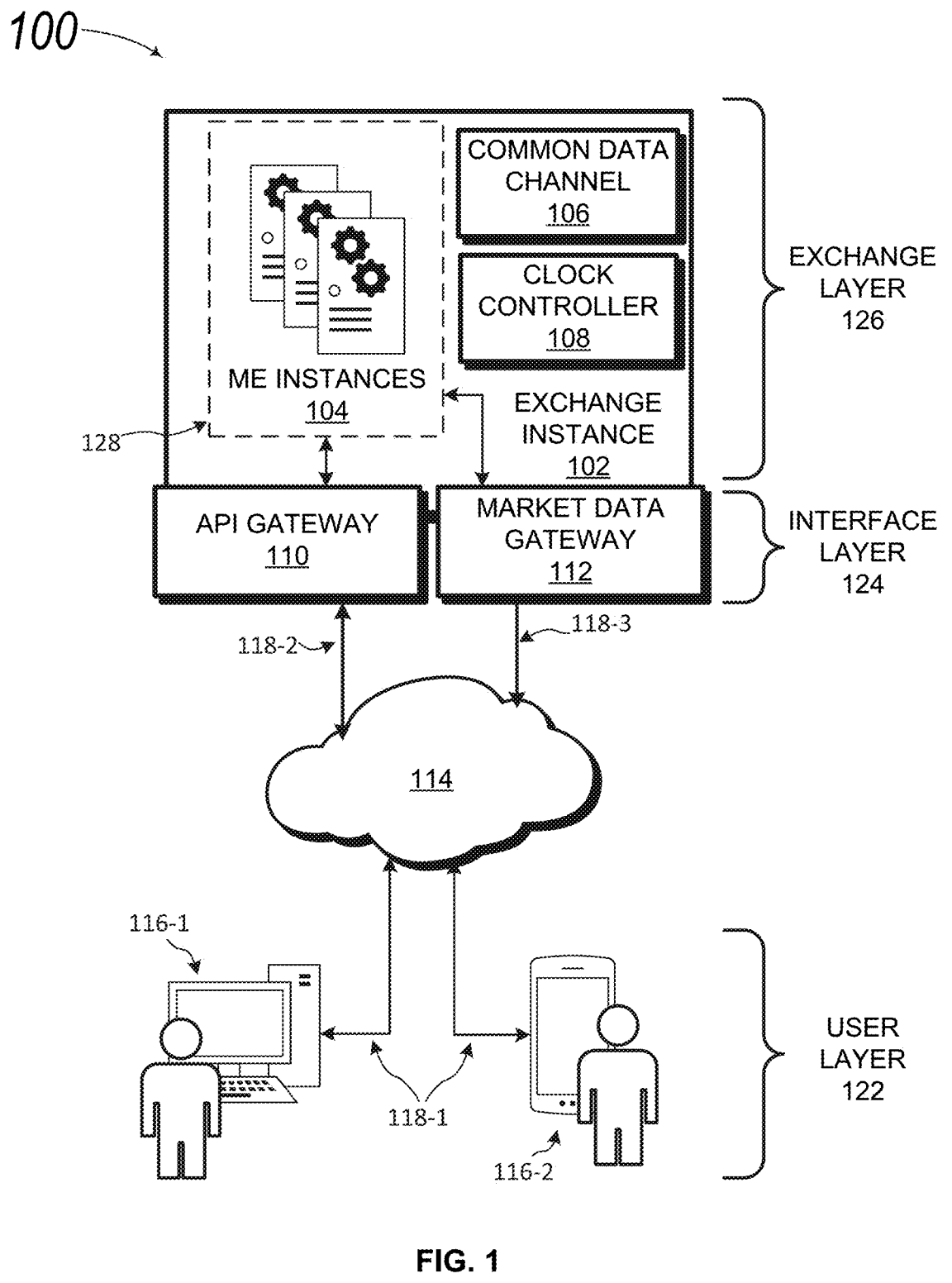

*100*

EXCHANGE LAYER 126

ME INSTANCES
104

COMMON DATA CHANNEL
106

CLOCK CONTROLLER
108

EXCHANGE INSTANCE
102

128

INTERFACE LAYER 124

API GATEWAY
110

MARKET DATA GATEWAY
112

118-2

118-3

114

116-1

118-1

116-2

USER LAYER 122

FIG. 1

ME INSTANCES 304

304-1     304-2     304-3

352       352       352

COMMON DATA CHANNEL 306

IE INSTANCE 390

TRANSACTION CONTROLLER 328

380       382

API GATEWAY 310

MARKET DATA GATEWAY 312

318-1     314     318-2

316-1

316-N

*500*

START

DERIVE A FIRST COMBO ORDER
*502*

IDENTIFY TARGET ME INSTANCES
ASSOCIATED WITH FIRST COMBO
ORDER
*504*

CAUSE A FIRST COMBO ORDER
PROVISIONING MESSAGE TO BE
OUTPUT TO TARGET ME INSTANCES
*506*

END

```
{
  "asset":{
    "exchangeId":229,
    "businessDate":20220606,
    "time":"20220605T210306.225031Z",
    "NoRelatedSym":1,
    "AssetTypeId":2324332,
    "AssetDesc":"31MY24_2.500/15MY25_2.750",
    "MinTradeVol":1000000,
    "DefaultOrderSize":1000000,
    "MinHiddenOrderSize":1000000,
    "ScreenLabelOne":"2YR vs 3YR [3:2]",
    "Symbol":"C_US02Y-US03Y",
    "AltSymbol":"C_US02Y-US03Y",
    "MEId":1,
    "ThreadId":2,
    "Legs":[
      {
        "LegSymbol":"T02YB",
                         "LegAltSymbol":"T_US02Y",
        "LegAssetId":2323869,
        "LegAssetType":"SOV",
        "LegAssetSubType":"BOND",
        "LegRatioQty":3000000,
                         "LegSide":1,
        "asset":{
          "exchangeId":229,
          "businessDate":20220606,
          "time":"20220605T210306.225061Z",
          "AssetID":2323869,
          "ContractMultiplier":1000000,
          "PriceMultiplier":1000000000,
          "AssetDesc":"T_31_MY_24_2.500",
          "MinTradeVol":1000000,
          "DefaultOrderSize":1000000,
          "MinHiddenOrderSize":1000000,
          "ScreenLabelOne":"2YR 2.500 05/24",
          "Symbol":"T02YB",
          "AltSymbol":"T_US02Y",
          "MEId":1,
          "ThreadId":1,
          "MaturityDate":"20240531",
          "IssueDate":"20220531",
          "SettlementDate":"20220607",
          "FirstSettleDate":"20220531",
          "FirstCouponDate":"20221130",
          "IssuePrice":0.0,
          "CouponRate":2.5,
          "InterestAccrualDate":"20220531",
          "AccruedInterestDays":7,
          "AccruedInterest":0.0478142077,
          "DaysToMaturity":724,
          "Currency":"USD",
        }
      },
```

```
{
    "LegSymbol":"T03YB",
    "LegAltSymbol":"T_US03Y",
    "LegAssetID":2321757,
    "LegAssetIDSource":"8",
    "LegAssetType":"SOV",
    "LegAssetSubType":"BOND",
    "LegRatioQty":2000000,
    "LegSide":2,
    "asset":{
        "exchangeId":229,
        "businessDate":20220606,
        "time":"20220605T210306.225107Z",
        "NoRelatedSym":1,
        "AssetID":2321757,
        "ContractMultiplier":1000000,
        "PriceMultiplier":1000000000,
        "AssetDesc":"T_15_MY_25_2.750",
        "RegulatoryTransactionType":0,
        "MinTradeVol":1000000,
        "DefaultOrderSize":1000000,
        "MinHiddenOrderSize":1000000,
        "ScreenLabelOne":"3YR 2.750 05/25",
        "Symbol":"T03YB",
        "AltSymbol":"T_US03Y",
        "MEId":2,
        "ThreadId":1, "AssetType":"SOV",
        "AssetSubType":"BOND", "MaturityDate":"20250515",
        "IssueDate":"20220516",
        "SettlementDate":"20220607",
        "FirstSettleDate":"20220516",
        "FirstCouponDate":"20221115",
        "IssuePrice":0.0,
        "CouponRate":2.75,
        "InterestAccrualDate":"20220515",
        "DayCountConvention":"A/A", "AccruedInterestDays":23,
        "AccruedInterest":0.171875,
        "DaysToMaturity":1073,
        "Currency":"USD",
    }
    ]
    }
}
```

```
{
  "Assets": [
    {
      "assetId": 2280010,
      "meId": 1,
      "threadId": 1,
      "assetType": "HF02Y"
    },
    {
      "assetId": 2280509,
      "meId": 2,
      "threadId": 2,
      "assetType": "C_US02Y-US03Y"
    },
    {
      "assetId": 2280510,
      "meId": 2,
      "threadId": 2,
      "assetType": "C_US02Y-US05Y"
    },
    {
      "assetId": 2278371,
      "meId": 3,
      "threadId": 1,
      "assetType": "HF03Y"
    },
    {
      "assetId": 2280504,
      "meId": 4,
      "threadId": 2,
      "assetType": "C_US03Y-US05Y"
    },
    {
      "assetId": 2280011,
      "meId": 5,
      "threadId": 1,
      "assetType": "HF05Y"
    }
  ],
```

```
"ComboGroups": [
  {
    "ComboGroupId": 1,
    "Members": [
      {
        "assetType": "C_US02Y-US03Y",
        "Side": "B",
        "LegRatioQty": 1000000,
        "PricingTarget": "Curve"
      },
      {
        "assetType": "HF02Y",
        "Side": "S",
        "LegRatioQty": 6000000,
        "PricingTarget": "FrontLeg"
      },
      {
        "assetType": "HF03Y",
        "Side": "B",
        "LegRatioQty": 4000000,
        "PricingTarget": "BackLeg"
      }
    ]
  },
  {
    "ComboGroupId": 2,
    "Members": [
      {
        "assetType": "C_US02Y-US03Y",
        "Side": "S",
        "LegRatioQty": 1000000,
        "PricingTarget": "Curve"
      },
      {
        "assetType": "HF02Y",
        "Side": "B",
        "LegRatioQty": 6000000,
        "PricingTarget": "FrontLeg"
      },
      {
        "assetType": "HF03Y",
        "Side": "S",
        "LegRatioQty": 4000000,
        "PricingTarget": "BackLeg"
      }
    ]
  },
```

FIG. 11B

```
{
  "ComboGroupId": 3,
  "Members": [
    {
      "assetType": "HF02Y",
      "Side": "B",
      "LegRatioQty": 6000000,
      "PricingTarget": "FrontLeg"
    },
    {
      "assetType": "HF03Y",
      "Side": "S",
      "LegRatioQty": 4000000,
      "PricingTarget": "BackLeg"
    },
    {
      "assetType": "C_US02Y-US03Y",
      "Side": "S",
      "LegRatioQty": 1000000,
      "PricingTarget": "Curve"
    }
  ]
},
{
  "ComboGroupId": 4,
  "Members": [
    {
      "assetType": "HF02Y",
      "Side": "S",
      "LegRatioQty": 6000000,
      "PricingTarget": "FrontLeg"
    },
    {
      "assetType": "HF03Y",
      "Side": "B",
      "LegRatioQty": 4000000,
      "PricingTarget": "BackLeg"
    },
    {
      "assetType": "C_US02Y-US03Y",
      "Side": "B",
      "LegRatioQty": 1000000,
      "PricingTarget": "Curve"
    }
  ]
},
```

FIG. 11C

```json
{
  "ComboGroupId": 5,
  "Members": [
    {
      "assetType": "HF03Y",
      "Side": "B",
      "LegRatioQty": 4000000,
      "PricingTarget": "BackLeg"
    },
    {
      "assetType": "HF02Y",
      "Side": "S",
      "LegRatioQty": 6000000,
      "PricingTarget": "FrontLeg"
    },
    {
      "assetType": "C_US02Y-US03Y",
      "Side": "B",
      "LegRatioQty": 1000000,
      "PricingTarget": "Curve"
    }
  ]
},
{
  "ComboGroupId": 6,
  "Members": [
    {
      "assetType": "HF03Y",
      "Side": "S",
      "LegRatioQty": 4000000,
      "PricingTarget": "BackLeg"
    },
    {
      "assetType": "HF02Y",
      "Side": "B",
      "LegRatioQty": 6000000,
      "PricingTarget": "FrontLeg"
    },
    {
      "assetType": "C_US02Y-US03Y",
      "Side": "S",
      "LegRatioQty": 1000000,
      "PricingTarget": "Curve"
    }
  ]
},
```

FIG. 11D

```json
{
  "ComboGroupId": 7,
  "Members": [
    {
      "assetType": "C_US02Y-US05Y",
      "Side": "B",
      "LegRatioQty": 1000000,
      "PricingTarget": "Curve"
    },
    {
      "assetType": "HF02Y",
      "Side": "S",
      "LegRatioQty": 100000000,
      "PricingTarget": "FrontLeg"
    },
    {
      "assetType": "HF05Y",
      "Side": "B",
      "LegRatioQty": 4000000,
      "PricingTarget": "BackLeg"
    }
  ]
},
{
  "ComboGroupId": 8,
  "Members": [
    {
      "assetType": "HF03Y",
      "Side": "B",
      "LegRatioQty": 8000000,
      "PricingTarget": "FrontLeg"
    },
    {
      "assetType": "HF05Y",
      "Side": "S",
      "LegRatioQty": 5000000,
      "PricingTarget": "BackLeg"
    },
    {
      "assetType": "C_US03Y-US05Y",
      "Side": "S",
      "LegRatioQty": 1000000,
      "PricingTarget": "Curve"
    }
  ]
}
}
```

FIG. 11E

SYSTEMS AND METHODS FOR DERIVING SYNTHETIC ASSETS AND ATOMIC TRANSACTION PROCESSING FOR THE SAME

TECHNICAL FIELD

The present disclosure relates generally to computer-implemented exchange systems for the trading of financial assets, and more particularly, to techniques for deriving synthetic assets and facilitating atomic transactions for the same within an exchange system that implements a distributed architecture.

BACKGROUND INFORMATION

Computer-implemented exchange systems (also referred to as simply exchange systems) enable the trading of assets and have continued to evolve to accommodate the ever-growing number of global exchanges and volume of daily trades. Traditional asset types such as financial instruments can be traded by modern computer exchange systems at a volume and speed which was unimaginable a few short decades ago. Current United States financial regulations define financial instruments as those assets representing government issued currency, or a contract establishing a right or obligation to deliver or receive value in the form of government issued currency or another financial instrument. Some example financial instruments include securities, stocks, option contracts, future contracts, and options on future contracts, among many others. However, virtually any asset that holds capital/value can be represented digitally for trading by a computer-implemented exchange, which has now led to many new markets including the trading of non-fungible tokens (NFTs) and cryptocurrencies via globally-accessible computer-implemented exchanges.

Regardless of the particular type(s) of assets tradeable on a computer-implemented exchange system, one common approach is to implement an order book for each type of financial instrument which is tradeable by the system. Each order book can be used to store a real-time list of outstanding orders in memory for the associated asset and represents the interests of buyers and sellers. Order books can be visualized by a user interface provided by an exchange system, for example, to allow the user to better understand current market conditions. The user interface can also allow for a user to execute one or more trade actions such as submitting new orders to buy or sell an asset, modifying previously-submitted orders, and cancelling orders. In some cases, an exchange system can provide an application programming interface (API) to enable a computer algorithm to access an order book and execute any aforementioned order action on behalf of a user including querying the order book and receiving real-time order and/or trade updates.

Exchange systems are often required to process vast amounts of order actions by users/API and store trading data associated with execution of trades to satisfy an order. This can include receiving and executing hundreds to thousands of order actions and related trades per second, for example. Exchange systems can include a process for managing order books for a given asset type including submission of new orders (e.g., on the buy or sell side), updating existing orders within an order book, and cancellation of orders and removal from an order book. Execution of trades in connection with an order book can include an algorithm/process for matching submitted orders to contra-side order(s) in the order book. After trade execution, an exchange system can store a representation of each executed trade as trading data stored within a database. In addition, the exchange system can output the trading data via market data updates which can be consumed/utilized by users via a network connection, for example.

BRIEF DESCRIPTION OF THE DRAWINGS

These and other features and advantages will be better understood by reading the following detailed description, taken together with the drawings wherein:

FIG. 1 shows a block diagram of an example exchange system consistent with aspects of the present disclosure;

FIGS. 10A-10B collectively show an example configuration file consistent with aspects of the present disclosure.

FIGS. 11A-11E collectively show another example configuration file consistent with aspects of the present disclosure.

The drawings included herewith are for illustrating various examples of articles, methods, and apparatuses of the teaching of the present specification and are not intended to limit the scope of what is taught in any way. Like reference numerals indicate like components throughout the figures.

DETAILED DESCRIPTION

Figure 2:
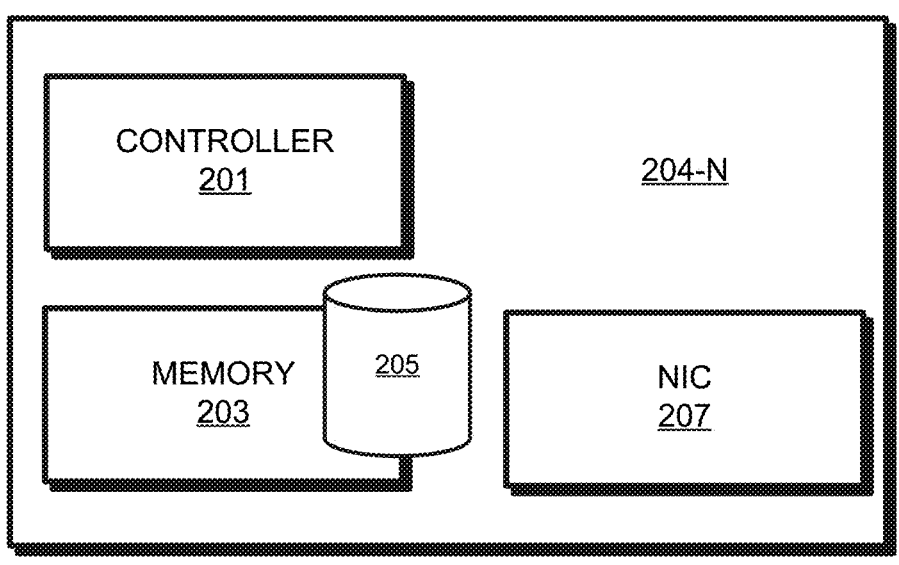
FIG. 2 shows a block diagram of an example matching engine (ME) instance consistent with aspects of the present disclosure.

As discussed above, the management of order books within an exchange system can include a process for submitting new orders into an order book, updating orders within the order book, cancellation of orders within an order book, and for matching orders with contra-side order(s) for purposes of trade execution. This process may also be referred to as a matching engine (ME) instance or simply a matching engine.

One approach to exchange systems includes a single ME instance that manages an order book for each asset type tradable by the exchange system. This ME instance can be implemented via a single thread/processor to avoid the potential for race conditions/conflicts during processing of orders and order book updates. This single-thread paradigm for an ME instance can provide high data integrity and ensure that transactions are executed in an atomic manner.

A transaction refers to execution of a single or multiple trades to satisfy an associated order. An atomic transaction refers to a transaction where each of the trades to satisfy an order are executed in an "all or nothing" manner such that all trades complete, or none at all, and other transaction/orders are prevented from interrupting/interfering with the atomic transaction. Atomic transactions therefore manifest as a single, indivisible unit of work that cannot be partially finished, and either is fully executed or rolled back to undue any memory/change that represents an intermediate state.

However, the single-thread paradigm for exchange systems unfortunately limits overall throughput, requires a significant amount of complex optimization to maximize throughput (e.g., to squeeze out every last drop of potential performance), and has limited ability to scale. In view of these shortcomings, some exchange systems implement a distributed ME approach where each ME instance is executed on a different thread/processor and manages a subset of order books, such as a single order book per ME instance. Distributed ME instances can communicate with each other via, for instance, computer networks or other suitable communication buses.

The benefit of a distributed ME instance approach is that an exchange system implementing the same can scale to accommodate, for instance, increased load and new asset types by instantiating additional ME instances, e.g., on dedicated processors/threads. However, one drawback of the distributed ME approach is that atomicity is limited to only those transaction that occur in connection with a single order book, or that occur in connection with a single ME instance. This is because each ME instance can operate on a different thread/processor in a manner that is concurrent/parallel to the other ME instances operating on their own threads.

Accordingly, a transaction that requires multiple stages/legs, which is to say execution of trades by two or more ME instances that each operate on different threads/processors, cannot be reliably performed by existing exchange systems in an atomic manner. This is because existing exchange systems aim to maximize order throughput and maintain processing latencies at or below a target threshold. Such processing latencies are generally measured, e.g., in milliseconds or microseconds, from when a request is submitted to an exchange system by a user to when a response is received by the user. Exchange systems aim to keep such latencies at or below an advertised/promised amount, i.e., the target threshold. Accordingly, distributed ME instances can operate without regard for other ME instances and seek to perform order processing and order book management as quickly as possible to minimize latency.

In view of this, implementing orders that require a combination of asset types to be traded via ME instances instantiated on different threads/processors within an exchange system raises non-trivial challenges. Such orders may be referred to herein as combination orders, or combo orders. One such example combo order can include a swap of a first asset type such as a 2-year benchmark government bond having a first yield value for an equivalent amount of a second asset type such as a 3-year benchmark government bond having a second yield value. In existing exchange systems with distributed MEs, this swap would require two manual legs to complete, namely a first leg that includes the user submitting a sell order to a first ME instance that manages the order book for the first asset type, a second leg that includes the user submitting a buy order (using the funds/credit from the first leg) to a second ME instance that manages the order book for the second asset type. In this scenario, the market for each asset type can shift dramatically and even a relatively small amount of time during performance of the first leg and second leg can result in substantial "slippage" in relative prices that result in the swap becoming undesirable to the user or otherwise less desirable than had the first and second legs been executed atomically.

One approach to implement atomic transactions for combo orders in distributed exchange systems can include introducing order book locks across ME instances associated with an atomic transaction. However, introducing locking in the ME instance processing can result in significant order processing latencies based on halting the processing of normal orders across each ME instance associated with the atomic transaction. Also, such locking can include the use of a central transaction controller that can be implemented on a dedicated thread/processor and operate as an orchestrator to cause locking and unlocking of order books across ME instances and to ensure that trades can fully execute across the same before a final commit occurs.

However, this can require a substantial amount of time for the central transaction processor to communicate with each ME instance to maintain state synchronization across the same, and to determine that each ME instance can perform the trade, e.g., has the necessary credits pre-allocated, and order(s) within the order book that satisfy the trade. Scenarios such as an ME instance being too busy to respond to the central transaction processor can potentially result in other ME instances stuck in a wait/lock state and thus introduce system latency. Other drawbacks to the central transaction controller include introducing a single point of failure, and the utilization of computer resources such as processor and memory that could be used for other purposes such as additional ME instances. Still yet further, exchange systems can have many different types of assets and associated order books for trading, e.g., tens or hundreds of asset types for trading, and this can result in multiple central transaction controllers to be deployed on dedicated hardware, which further increases system complexity, hardware resources/footprint, and ultimately can limit an exchange system's ability to scale.

Thus, in accordance with an aspect of the present disclosure, an exchange system is disclosed that implements a combo order protocol that allows for combo orders to be provisioned across a plurality of distributed ME instances. The plurality of distributed ME instances of the exchange system can maintain an order book for an associated asset when in a "normal" state, and can be configured to transition from the normal state to a combo order transaction state to execute a leg of a provisioned combo order in concert with the other associated ME instances and in an atomic manner that both guarantees zero price "slippage" for the combo order and that minimizes or otherwise reduces the potential for introducing processing latencies (e.g., due to order book locking).

ME instances consistent with the present disclosure can send and receive combo order protocol messages between each other to ensure synchronization of state across the ME instances during the execution of combo order transactions. This allows for ME instances to effectively transition into, and out of, combo order transaction processing so that the order books distributed across the ME instances effectively lock and unlock at nearly instantaneous points in time, e.g., within 5 to 500 microseconds of each other, and more preferably, within 5 to 100 microseconds of each other. The combo order protocol messages can be output to a common data channel such as a multicast group to allow for a single message to be output and received by multiple ME instances. Preferably, the length of each combo order protocol message is less than 512 bytes, and more preferably, less than or equal to 100 bytes to minimize delivery time between ME instances and limit the overall memory and processor footprint associated with sending and receiving the combo order protocol messages.

Accordingly, ME instances consistent with the present disclosure can collectively execute atomic transactions for a combo order based on each ME instance independently maintaining state awareness of the other ME instances and synchronizing state therebetween, thus avoiding the necessity of a centralized transaction controller and the numerous drawbacks of the same discussed above.

The term "synthetic asset" refers to an asset whose characteristics (e.g., price, quantity available, duration of time available to trade) is based on one or more other assets tradeable within an exchange system. Preferably, such other assets are non-synthetic assets, although this disclosure is not limited in this regard.

Turning to the figures, FIG. 1 shows an example exchange system 100 consistent with aspects of the present disclosure. The exchange system 100 may also be referred to herein as a distributed exchange system or simply an exchange system.

In the example of FIG. 1, the exchange system 100 includes a plurality of layers including a user layer 122, an interface layer 124, and an exchange layer 126.

The user layer 122 can include one or more computer devices such as a first computer device 116-1 and a second computer device 116-2. The one or more computer devices can be implemented as workstation computers, server computers and/or mobile computers (e.g., smart phones, laptops, tablets, smart watches).

The one or more computer devices within the user layer 122 are preferably implemented with a network interface circuit (NIC) to communicate with a wide area network 114. The wide area network 114 can be implemented as, for example, the Internet. In the example of FIG. 1, the first and second computer devices 116-1, 116-2 respectively transmit and receive signals 118-1 from the wide area network 114 via a protocol that preferably conforms with a standard protocol such as an Institute of Electrical and Electronics Engineers (IEEE) 802.X standard. In one example, the signals 118-1 are data packets that comport with the Transmit Control Protocol (TCP).

Preferably, the one or more computer devices within the user layer 122 are configured to execute programs or "apps" that enable communication with the interface layer 124, which is discussed in further detail below.

The interface layer 124 preferably includes an application programming interface (API) gateway 110 and a market data gateway 112. The API gateway 110 and the market data gateway 112 can be implemented via hardware, software, or a combination thereof. The API gateway 110 can be implemented as a representational state transfer (REST) API gateway, although other API gateway types may be utilized such as Simple Object Access Protocol (SOAP), Remote Procedure Call (RPC), Financial Information exchange (FIX) and proprietary binary messaging (BIN).

The API gateway 110 can be configured to receive signals 118-2 via the wide area network 114. The signals 118-2 can be the same or different from the signals 118-1. In one example, the signals 118-1 and 118-2 are implemented as TCP packets. The API gateway 110 can be configured to receive user requests from the user layer 122, e.g., from computer device 116-1 via the signals 118-2. The user requests can include new order submission requests, order change/modification requests, order execution request, and order status requests, for example. The API gateway 110 can be configured to process/satisfy user requests by communicating with one or more ME instances, which are discussed in further detail below.

The market data gateway 112 can be configured to output market data in a standard format, e.g., JavaScript Object Notation (JSON), FIX, and/or BIN. Such market data can include, for example, order activity (e.g., add, modify, trade, cancel), a timestamp value for each activity, and/or prices and sizes of associated orders. The market data gateway 112 can output market data via signals 118-3 to a network such as the WAN 114.

As shown in the example of FIG. 1, the exchange layer 126 includes an exchange instance 102. The exchange instance 102 preferably includes a plurality of components for order management workflows including, for example, new order creation, order update/modifications, matching of orders, and publishing/output of pricing data (e.g., current bid/ask pricing). The plurality of components can be implemented via hardware, software, or a combination thereof. The plurality of components can be implemented via a single computer server or via a plurality of computer servers which communicate with each other via a network (not shown).

In the example of FIG. 1, the exchange instance 102 includes a plurality of ME instances 104, a common data channel 106, and a clock controller 108. As discussed in further detail below, the plurality of ME instances 104 can collectively provide a distributed transaction controller 128, which may also be referred to herein as simply a transaction controller.

The plurality of ME instances 104 can be implemented via a same or different controllers/processors. One such example controller 201 is discussed further below with reference to FIG. 2. In one preferred example, each ME instance of the plurality of ME instances 104 is implemented on a different processor/thread such that each ME instance has dedicated processor resources. Each ME instance is preferably implemented via the same plurality of machine-readable instructions stored in a memory, e.g., the same program code/instructions, as the other ME instances. This allows each ME instance to manage order workflows and an order book for potentially any of the asset types based on the local provisioning/configuration for the same. One example configuration file for provisioning of a ME instance consistent with the present disclosure is discussed further below with reference to FIGS. 10A-10B.

In addition, updates for purposes of bug fixes, security patches and/or feature upgrades can be deployed to the ME instances in a unified manner. Of course, ME instances may have different operating code/programs relative to other ME instances, or a different version of common operating code/programs for the ME instances depending on a desired configuration.

Each ME instance is preferably configured to store an ME instance identifier, which may also be referred to herein as an instance identifier or member instance identifier, in a memory. The ME instance identifier for each ME instance is preferably unique within the exchange system 100. The ME instance identifier can be used to address/route messages to a target ME instance when executing a combo order transaction process, as will be discussed in greater detail below. Preferably, each ME instance includes local provisioning data in memory that can be used to instantiate a representation of the ME identifier into memory.

One example of a configuration file 1000 for provisioning a ME instance consistent with the present disclosure is shown in FIGS. 10A and 10B. The configuration file 1000 may also be referred to herein as a ME instance definition. As shown, configuration file 1000 is in a JavaScript Object Notation (JSON) format and can be stored, for instance, as a file within a memory of a ME instance.

A controller, e.g., controller 201 of FIG. 2, may then execute a ME instance based on instructions stored in a memory and provision the executed ME instance based on the configuration file 1000. Such provisioning can include, for example, establishing which asset type the executed ME instance will process orders for based on the asset type identifier 1002, and the assigned identifier for the executed ME instance based on the ME identifier 1004. Preferably, the assigned identifier uniquely identifies the executed ME instance within an exchange system, e.g., system-wide, and/or within a plurality of ME instances within an exchange system.

In addition, the provisioning can include assigning a particular thread of a controller to the executed ME instance based on the thread identifier 1006. In one example, a controller may have a predetermined number of threads available based on, for instance, the number of physical cores the comprise the controller. These threads may be configured to allow for instructions to be executed in parallel. Accordingly, each thread may be configured to execute and provide runtime compute resources for one or more ME instances. Preferably, each ME instance is assigned to a dedicated thread such that no two ME instances share the same thread. However, two or more ME instances may be executed by a single thread depending on a desired configuration.

In one example, ME instances are assigned to controllers and respective thread(s) of the controller based on combo order associations. Consider one example scenario of ME instances which are associated with a 2 year-3 year benchmark swap. This can include a first ME instance configured to process orders for a 2-year benchmark asset, a second ME instance configured to process orders for a 3-year benchmark asset, and a third ME instance configured to process orders for a synthetic asset that represents a swap of 2-year benchmarks for an equivalent amount of 3-year benchmarks. In this example, at least the first and second ME instances may be assigned to a respective thread of a same/shared controller. Preferably, the first and second ME instances are assigned to different threads of the same/shared controller, and more preferably, assigned to different and dedicated threads. A dedicated thread in the context of a ME instance refers to a thread that only executes and provides runtime compute resources to a single ME instance. The third ME instance is also preferably assigned to a thread of the same/shared controller.

The first, second and third ME instances may then be co-located on the same/shared processor based on their respective instruments/asset types being associated with a first combination order, which in the immediate example includes a combination order that allows for the swap of a quantity of 2-year benchmark assets for 3-year benchmark, or vice versa. This swap preferably occurs via a multi-leg/stage combo order transaction consistent with the present disclosure. The controller co-location of the first, second and third ME instances may then advantageously allow for communication between each other that does not necessarily require socket-based communication such as through TCP/IP. Instead, the controller co-located ME instances may communicate with each other via, for instance, a lock-free queue or other direct inter-process communication channel during, for example, a combo order transaction. A direct inter-process communication channel refers to a communication channel between a first ME instance and a second ME instance that allows a message to be sent therebetween without the use of a network interface circuit and/or a network stack (e.g., TCP/IP stack) of a host machine. The direct inter-process communication channel may also be referred to as a socket-less channel. A lock-free queue refers to a queue that may be accessed concurrently by two or more ME instances (which are executed on a same or different thread of a same/shared controller), such that access to data of the lock-free queue (e.g., via a enqueue or dequeue operation) by a first ME instance does not slow or otherwise prevent a concurrent access to data of the lock-free queue by a second ME instance. Note, the direct inter-process communication channel is not limited to lock-free queues and other suitable approaches may be utilized.

In any event, this disclosure has identified that messages having an overall length in a range of 64 to 128 bytes communicated via direct inter-process communication (e.g., using lock-free, non-blocking channels/queues) have a delivery time measured from when the first ME instance outputs the message to when the second ME instance receives the message into working memory (e.g., user space memory) of $300\pm50$ nanoseconds. In the context of a x86_64 architecture, the message size for messages communicated via the direct inter-process communication is preferably a minimum of 64 bytes based on the cache line size. In this example, x86/x64 processors can write an entire cache line, e.g., all 64 bytes, in a single operation, so preferably the messages sent via the direct inter-process communication are at least 64 bytes, or a multiple thereof. In one example, each message communicated via the inter-process communication is 128 bytes in overall length. In this example, the payload may be less than 128 bytes, e.g., 120 bytes, with the remainder of the bytes being padding (e.g., set to 0x0). In contrast, messages in a range of 64 to 128 bytes sent via a socket, e.g., a TCP or UDP socket, between ME instances have a delivery time of $1.2\pm0.1$ microseconds when the ME instances are executed by a same controller/host, and $1.6\pm0.1$ microseconds when the ME instances are executed on different hosts coupled to a same network.

Of course, actual delivery times vary based on a range of factors including, for example, data traffic rates, length of cabling between hosts, the performance of network components, number of hops, and so on. However, this disclosure has identified that direct inter-process communication between ME instances has reduced delivery time by orders of magnitude relative to socket/network-based communication.

As further shown in FIG. 10A, the configuration file 1000 can include a legs collection 1008. The legs collection can include a plurality of leg definitions for the particular ME instance being provisioned using the configuration file 1000. The leg definitions can be used to provision the ME instance with the leg properties for a combo order transaction. The ME instance may then utilized the leg properties when determining the particular action(s) to perform during combo order transactions.

Returning to FIG. 1, the common data channel 106 can be configured to allow for the plurality of ME instances 104 to communicate with each other. In one example, the common data channel 106 is an Ethernet network or other suitable communication network.

The clock controller 108 can be implemented as hardware and/or software and can be utilized by the plurality of ME instances 104 as a common clock for synchronization purposes. Preferably, the plurality of ME instances 104 can use an output signal from the clock controller 108 to maintain a time synchronization between ME instances in a range of about 1 to 25 microseconds.

FIG. 2 shows an example ME instance 204-N consistent with aspects of the present disclosure. The ME instance 204-N includes a controller 201, a memory 203, and a network interface circuit (NIC) 207. The ME instance 204-N can include additional components/circuitry and is not necessarily limited to the example shown in FIG. 2. The controller 201 can be implemented as a digital signal processor (DSP), application specific integrated circuit (ASIC), field programmable gate array (FPGA), or any other suitable processing device. The memory 203 can comprise volatile, e.g., random access memory (RAM), and/or non-volatile memory such as Flash storage. The memory 203 can include a database 205, such as a flat file database or a relational database. The database 205 can further include a lookup table in memory for representing, for example, provisioned combo orders, combo order groups, and asset properties associated with combo order groups, as will be discussed in further detail below. The database 205 can further include a table/structure in memory for representing the local state of the ME instance during combo order transactions, and preferably, for also representing the state of remote ME instances associated with a given combo order. The network interface circuit 207 can comprise any device suitable for communication via a network, e.g., the common data channel 106 and/or the network 114 (See FIG. 1).

Figure 3:
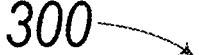
FIG. 3 shows another block diagram of the example exchange system of FIG. 1, in accordance with aspects of the present disclosure.

FIG. 3 shows an example of an exchange system 300 consistent with aspects of the present disclosure. The exchange system 300 may be implemented as the exchange system 100 of FIG. 1, the examples, and features of which are equally applicable to the exchange system 300 and will not be repeated for brevity.

As shown, the exchange system 300 includes a plurality of ME instances 304, namely ME instance 304-1, 304-2, and 304-3 that collectively provide a transaction controller 328. The plurality of ME instances 304 can communicate with each other via a common data channel 306. The common data channel 306 can be used for socket/network based communication. For example, the common data channel 306 can be implemented via an Internet Protocol (IP) multicast channel/group. In this example, signals 352 from each of the ME instances may therefore be IP multicast packets that get sent and/or received by respective NIC devices, e.g., NIC 207 of FIG. 2. Note, the common data channel 306 may include N number of multicast addresses, e.g., IPv4 addresses and/or IPv6 addresses, depending on a desired configuration.

Each of the ME instances of the plurality of ME instances 304 may communicatively couple to a same multicast group such that the signals 352 sent to the common data channel 306 from a given ME instance are also sent to, and received by, N number of other ME instances. Alternatively, or in addition to IP multicast, the common data channel 306 can be implemented with other communication protocols such as User Datagram Protocol (UDP).

In any event, the common data channel 306 is preferably configured to allow for N number of ME instances of the plurality of ME instance 304 to communicate with each other in a broadcast mode such that a single packet sent via signals 352 can be sent to, and received by, multiple target ME instances. As discussed in further detail below, ME instances which are associated with each other to execute combo order transactions may therefore be assigned to a same channel/group within the common data channel 306.

For example, the first ME instance 304-1, the second ME instance 304-2, and the third ME instance 304-3 may be associated with a first combo order such as for a 2-year/3-year benchmark swap synthetic asset, and can be configured to communicate with each other via a single, common communication channel provided by the common data channel 306. The single, common communication channel may be a multicast group that is dedicated to communication between the first, second and third ME instances 304-1, 304-2, 304-3, respectively. Preferably, the collective number of network hops between each ME instance and the other ME instances through the common data channel 306 is less than 5 hops, and more preferably, less than 3 hops.

Other ME instances (not shown) within the exchange system 300 may also be associated with a second combo order that is the same or different than the first combo order. These other ME instances may communicate via their own dedicated communication channel provided via the common data channel 306, or via the same multicast group/channel as the first, second and third ME instance 304-1, 304-2, 304-3, respectively.

In one example, each data channel provided via the common data channel 306 has a predetermined maximum number of ME instances for purposes of minimizing transmission latencies and to limit the overall number of packets that each ME instance receives via a given data channel of the common data channel 306 during operation. The predetermined maximum is preferably a multiple of three. In one preferred example, the predetermined maximum is equal to three such that only three ME instances subscribe to a given data channel.

Limiting the overall number of ME instances per channel can reduce the number of incoming packets that each ME instance receives, and thus, the overall amount of memory and processor resources, e.g., NIC memory and processor time, necessary to ensure that received packets can be received (e.g., clocked via NIC circuitry) and made available to ME instances for further processing, e.g., via a combo order process consistent with aspects of the present disclosure. The overall amount of time measured from when a packet is available on the common data channel 306 to when an ME instance has the packet available in local/working memory, e.g., memory 203 of FIG. 3, for processing by the same is preferably in a range of 1 to 100 microseconds.

The transaction controller 328 is preferably implemented in a distributed fashion via the plurality of ME instances 304 as discussed above. This can include an ME instance being provisioned as a master/arbitrator for a given synthetic asset or plurality of synthetic assets. For instance, the first ME instance 304-1 may be configured to operate in a master/arbitrator mode. In the master/arbitrator mode, the first ME instance 304-1 may then execute an implied engine (IE) 390 instance consistent with the present disclosure. In this example, the first ME instance 304-1 may be selected as the master/arbitrator based on a polling/voting scheme implemented by each ME instance. Preferably, the IE instance does not act as a centralized controller during a combo order transaction process consistent with the present disclosure. Note, the IE instance 390 may also be implemented via a different controller/processor, i.e., not by an ME instance, depending on a desired configuration.

The IE instance 390 may be configured to perform various tasks such as deriving combo orders for synthetic assets and causing the provisioning of combo orders in associated ME instances, as will be discussed in further detail below with reference to FIG. 4A and FIG. 5. Preferably, each combo order provisioned by the IE instance 390 is associated with a synthetic asset.

The synthetic asset for each combo order is preferably based on two different asset types which are tradeable by the exchange system 300. As previously discussed, one such example synthetic asset type includes a benchmark government bond swap, which may also be referred to herein as a benchmark swap. A benchmark swap-type asset can be used by an exchange system consistent with the present disclosure to execute the swap of associated assets, e.g., the swap of N units of a first benchmark for an equivalent amount of units of a second benchmark, and vice-versa. Preferably, the exchange system executes the swap of the associated assets in a distributed manner, which is to say as a combo order, across multiple ME instances as discussed in greater detail below. The first benchmark can have a first present value (PV) and a first yield value that is based on a first maturity period, e.g., 2 years. Likewise, the second benchmark can have a second present value (PV) and second yield value that is based on a second maturity period, e.g., 5 years. The maturity period refers to the amount of time measured from when the benchmark was issued to when the maturity date is reached, i.e., the specific date when the bond must be paid back at its face value. Some common maturity periods include 2-year, 3-year, 5-year, 7-year, 10-year, 20-year, and 30-year benchmarks, for example.

The yield value, or bond yield value, is the return an investor realizes on an investment in a bond. One way to measure a bond's yield is using the Yield to Maturity (YTM) value, which measures the total return expected on a bond if the same was held to maturity. One example YTM calculation is shown in Equation 1:

$$YTM = \sqrt[n]{\frac{Face\ Value}{Current\ Price}} - 1 \qquad \text{Equation 1}$$

Where n is equal to the number of years to maturity, Face Value is the bond's maturity or par value, and Current Price is the bond's current marker/offer price.

Although the YTM value is considered a long-term bond yield, it is generally expressed as an annual rate. Accordingly, the YTM value is effectively a bond's internal rate of return (IRR) if held to maturity.

Another example equation for determining a bond's yield value can be based on coupon payments (e.g., yield=coupon/price). For example, consider a benchmark with a yearly coupon payment of $60 and a present value (PV) of $1000. In this example, the yield is 6% (60/1000=0.06). Thus, yield changes with the market value of the benchmark. Note, this disclosure is not necessarily limited to one approach to determining bond value and the provided examples are not intended to be limiting.

Yield curves can be generated by investors/participants to compare benchmarks with different maturity dates and to balance risk versus reward. Participants can use the shape of the curve to forecast/determine future interest rates. Generally yield curves have a positive slope because shorter maturities tend to yield less relative to longer maturities. Positive slope suggests economic growth, and thus, inflation and higher interest rates. On the other hand, negative yield curves can indicate economic slowdown or contraction and potentially lower interest rates. In this scenario, shorter maturities can yield potentially more than longer maturities. In any event, when yield curves shift from positive to negative, or vice-versa, this can cause participants to want to swap benchmarks to take advantage of, for instance, short-term market gains.

The IE instance 390 may therefore derive one or more synthetic instruments to enable benchmark swaps via a combo order. Preferably, each benchmark tradeable in the exchange system 300 has a dedicated ME instance and order book that is executed on a thread/processor that is different than the other ME instances. The IE instance 390 can derive the one or more synthetic instruments based on real-time market pricing from the ME instances associated with the benchmarks. The IE instance can derive the synthetic instrument based on, for example, the difference in relative yield values between two benchmarks, e.g., between a 2-year and 3-year benchmark. The difference in relative yield value between two benchmarks can also be referred to as a yield spread or a spread.

The IE instance may then cause a combo order to be provisioned into memory by each respective ME instance for the 2-year and 3-year benchmark. Preferably, the IE instance also causes the combo order to be provisioned into memory by an ME instance that manages an order book for the synthetic asset. The ME instance that manages the ME instance for the synthetic asset may also be referred to as a synthetic asset ME instance. As discussed in further detail below, the provisioning for a combo order can define the various roles for the ME instances, e.g., first leg, second leg.

Continuing with FIG. 3, the IE instance 390 can be configured to store a ME instance lookup in a memory, e.g., memory 203 of FIG. 2. The ME instance lookup can include a plurality of entries that associate an identifier of an ME instance with an identifier of an asset type associated with the ME instance. The ME instance lookup may also be referred to herein as a combo order configuration lookup. For example, the ME instance lookup can include a first entry that associates an identifier of a first ME instance, e.g., the first ME instance 304-1, with an identifier of a first asset type. The first asset type can be, for example, a debt security with a first yield value and a first maturity period. One such example debt security includes a benchmark having a maturity period of at least two years, although other asset types are within the scope of this disclosure. The first ME instance can manage an order book and order workflows for the execution of trades in connection with buying and selling of quantities of the first asset type. Note the ME instance lookup of the IE instance 390 can be provisioned/instantiated based on a provisioning configuration file, one such example of which is shown in FIGS. 11A-11E. In one example, the IE instance 390 can output the combo order configuration file to ME instances as a combo order configuration message, e.g., via the common data channel 306, to cause each ME instance receiving the combo order configuration message to provision a lookup table in memory based on the same. The combo order configuration message output by the IE instance 390 to ME instances via the common data channel 306 can be in a predetermined format such as JSON, although this disclosure is not limited in this regard.

The ME lookup can further include a second entry that associates an identifier of a second ME instance, e.g., the second ME instance 304-2, with an identifier of a second asset type. The second asset type can be the same or different than the first asset type. In one example, the second asset type is a debt security with a second yield value and second maturity period. The second ME instance can manage an order book and order workflows for the execution of trades in connection with buying and selling of quantities of the second asset type. The second yield value of the second asset type can be different than the first yield value of the first asset type, and the second maturity period of the second asset type can be different than the first maturity period of the first asset type. For instance, the second asset type can be a benchmark with a maturity period of 3 years and a yield value of X, and the first asset type can be a benchmark with a maturity period of 2 years and a yield value of Y.

The aforementioned ME instance lookup stored in the memory of the IE instance 390 can further associate each entry with additional properties/values such as the present value (PV) and one or more additional/secondary values such as a yield value in the context of debt securities. In one example, the IE instance 390 is configured to derive or "imply" a combo order for a synthetic instrument based on the values stored within the ME lookup for each ME instance.

The ME lookup within the memory further preferably includes an entry associated with a third ME instance that manages an order book for a synthetic asset that can be traded via a combo order. For example, the first ME instance 304-1 can be configured to manage an order book for 2-year benchmarks and the second ME instance 304-2 can be configured to manage an order book for 3-year benchmarks. In this example, the third ME instance 304-3 can be configured to manage an order book for the synthetic asset that represents the combination of the 2-year and 3-year benchmarks for swap purposes. Note, the ME lookup within the memory of the IE instance 390 may be provisioned via a configuration file such as the example configuration file of FIGS. 11E-11E. In one example, each of the ME instances 304 and the IE instance 390 can utilize the same/identical configuration file for provisioning purposes. Preferably, the configuration file used to provision ME instances in the exchange system defines all combo orders, system-wide, such that ME instances can determine associated properties for both the combo orders they have an assigned role in as well as the properties for combo orders in which they are not associated with, e.g., do not have an assigned role in.

Figure 7:
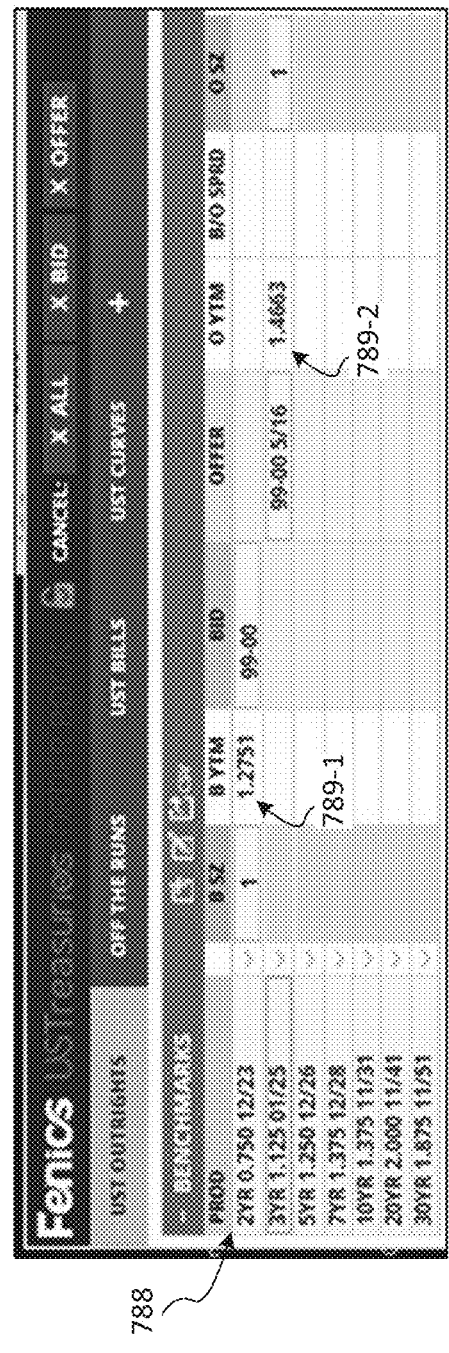
FIG. 7 shows an example user interface suitable for use by the exchange system of FIG. 1.

FIG. 7 shows an example user interface (UI) 700 consistent with aspects of the present disclosure. The UI 700 may be based on an "app" or webpage that is in communication with the exchange system 300 via a network connection and API gateway 110 (See FIG. 1) for example. As shown, the UI 700 visually represents the available benchmarks for trade within the exchange system in benchmark list 788. Each benchmark in the benchmark list 788 can include associated characteristics including maturity period, e.g., "2YR", yield value (e.g., YTM value), and date of maturity. Each benchmark in the list can be further associated with real time market data including current bid and offer prices based on data with the order books of the corresponding ME instances. The real time market data can visually represent yield values for each of the tradeable benchmark types in a table/tabular format. In the example of FIG. 7, the market data information of the UI 700 includes at least a visual representation of a first yield value 789-1 associated with the 2-year benchmark and the second yield value 789-2 associated with a 3-year benchmark.

Figure 8:
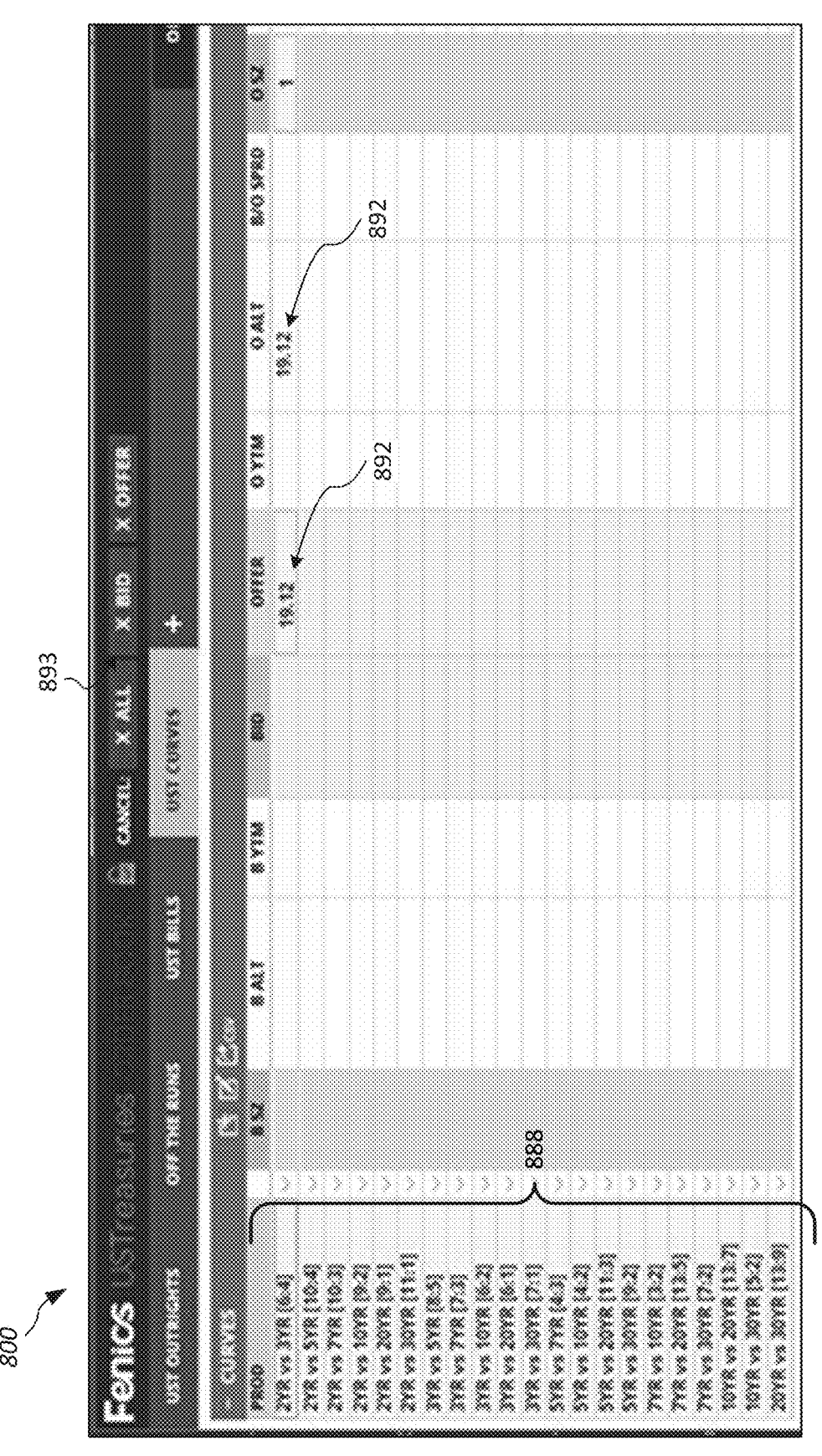
FIG. 8 shows another example user interface suitable for use by the exchange system of FIG. 1.

FIG. 8 shows another example UI 800 consistent with aspects of the present disclosure. The UI 800 may be based on an "app" or webpage that is in communication with the exchange system 300 via a network connection and API gateway 110 (See FIG. 1) for example. As shown, the UI 800 visually represents the available synthetic assets for trade within the exchange system in a synthetic asset list 888. Each synthetic asset in the synthetic asset list 888 can be associated with an ME instance that manages a corresponding order book. In the example of FIG. 8, each synthetic asset in the synthetic asset list 888 represents an available type of benchmark swap. Preferably, each synthetic asset in the synthetic asset list 888 can include a visual representation of characteristics such as the benchmark targets for the swap and preferably a value such as a unit ratio for the swap.

In the example of FIG. 8, the 2 year-3 year swap ("2YR vs 3YR [6:4]") has an associated ratio of 6:4 visually represented. In this example, the 6:4 ratio indicates that every 6 units of 2-year benchmarks swapped for 3-year benchmarks will result in a user receiving 4 units of the 3-year benchmarks. Likewise, the 6:4 ratio indicates that for every 4 units of 3-year benchmarks swapped for 2-year benchmarks will result in a user receiving 6 units of the 2-year benchmarks. The UI 800 of FIG. 8 further preferably includes a visual representation of a spread value, such as spread value 892, that is associated with each synthetic asset. In the example of FIG. 8, the spread value 892 can be calculated based on the absolute difference between the first and second yield values 789-1, 789-2 (see FIG. 7) that are associated with 2-year and 3-year benchmarks, respectively, e.g., $|1.2751-1.4663| \times 100 = 19.2$.

Figure 9:
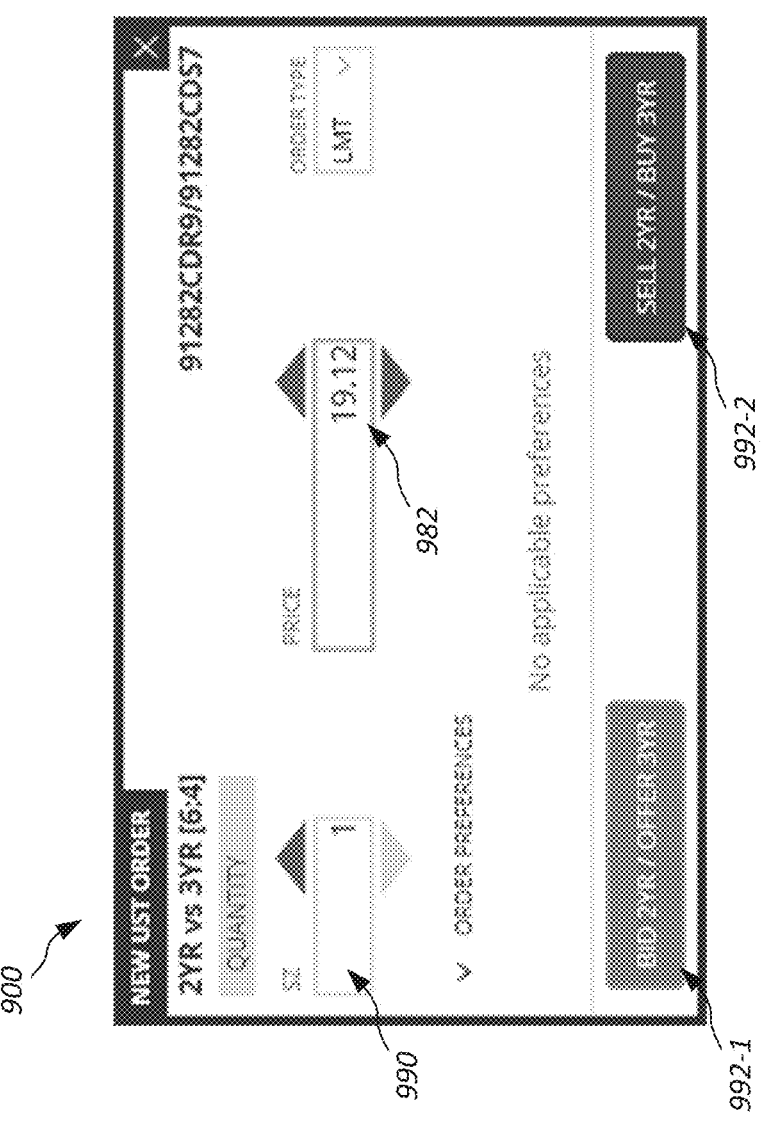
FIG. 9 shows another example user interface suitable for use by the exchange system of FIG. 1.

FIG. 9 shows another example UI 900 consistent with aspects of the present disclosure. The UI 900 may be based on an "app" or webpage that is in communication with the exchange system 300 via a network connection and API gateway 110 (See FIG. 1) for example. As shown, the UI 900 can be visualized after, for example, a user double clicks a synthetic asset entry within the synthetic asset list 888 or other UI control such as buttons 893 (See FIG. 8). The UI 900 can be used to initiate a combo order in connection with the swap of the 2-year benchmark for the 3-year benchmark, or vice versa. In this example, a user can input a size parameter 990 to indicate a number of desired units. Each unit can represent N amount of a given asset, such as 1 million (M). The spread value 982 can be populated automatically for the user based on the spread value shown in FIG. 8. The user may then select an option to cause the swap to occur in a desired manner. For instance, the user can select the first button 992-1 to sell/bid an amount of 3-year benchmarks specified by the user as the size parameter 990 for an equivalent amount of 2-year benchmarks at the spread value 982, which in this example can be a 4:6 ratio and have a corresponding spread value of 19.12. Likewise, the user can select the second button 992-2 to sell/bid an amount of 2-year benchmarks specified by the user as the size parameter 990 for an equivalent amount of 2-year benchmarks at the spread value 982, which in this example can be a ratio of 4:6 and have a corresponding spread value of 19.12.

In either case, the user can cause an execute order request to be sent to the exchange system 300 to initiate execution of a combo order. Once a user executes a combo order, e.g., via selection of the first or second buttons 992-1, 992-2 respectively, the combo order transaction can execute and complete without further user interaction/input. Preferably, the exchange system 300 guarantees that the combo order will be executed for the size set by the size parameter 990, and at the specified spread value 982 and ratio. As discussed in further detail below, this can include the exchange system executing an atomic transaction via a plurality of ME instances which can operate in concert to perform a multi-leg/stage commit without the necessity of a centralized controller. Each leg/stage in a combo order transaction consistent with the present disclosure includes one or more actions to be performed by an associated ME instance. Preferably, any failure during performance of a leg results in an entire combo order transaction being rolled back such that the state of each ME instance, and in particular the state of each associated order book, is identical to the state prior to execution of a combo order transaction. Simply put, all in-memory changes/writes by an ME instance during execution of a combo order transaction, e.g., the creation of temporary/provisional orders in memory, modification to an order book, changes/updates to a credit ledger, generation of market data updates, can be removed or invalidated in memory based on a transaction rollback, which may be simply referred to herein as a rollback.

Returning to FIG. 3, during operation the exchange system 300 can receive requests from user devices, such as a market data gateway 312. As shown in the example of FIG. 3, this includes signals 318-2 being sent to one or more subscribing computer devices such as computer device 316-1 and computer device 316-N.

Combo Order Protocol and Process Flow

Each combo order message preferably includes a messageType field. The messageType field is preferably the first byte(s) within the message (e.g., at byte position zero) such that the messageType is the first byte(s) of a message received via the common data channel 306 (See FIG. 3). Each combo order message is preferably associated with a unique message Type value. Example values for the messageType field is shown below in Table 1.

TABLE 1

| Message Name | messageType value (Integer) | Description |
|---|---|---|
| comboOrderProvisioning | 0x01 | Establishes/provisions a combo order within system and/or provides combo order status |
| comboStatus | 0x02 | Requests status of provisioned combo order within system |
| comboHeartBeat | 0x03 | Periodic heartbeat to indicate on-going availability of combo order provisioned within system |
| meStateChange | 0x04 | Used to indicate a change in a state of a ME instance associated with a provisioned combo order within system (e.g., started, stopped, paused, shutting down, error state) |
| orderReceived | 0x05 | Used to indicate an order directed to a provisioned combo order was received and to confirm ME instances can facilitate order |
| orderSubmitted | 0x06 | Used to initiate an order transaction directed to a provisioned combo order |
| readyToTrade | 0x07 | Used to synchronize state between ME instances during an order transaction for a provisioned combo order |
| tradeComplete | 0x08 | Used to synchronize commit/execution of order transaction for a provisioned combo order |
| executeOrder | 0x09 | Used to cause execution of a combo order |
| cancelTrade | 0x0a | Used to cause cancellation of a combo order | first computing device 316-1 via signals 318-1 received from a network 314. The requests can be, for instance, an execute order request in connection with a synthetic asset and associated combo order. The execute order request can be based on user input via a UI, such as via the UI interface screens of FIGS. 7-9, which were discussed above.

The request to execute the order for the combo/synthetic asset may be received via an API gateway 310 and sent as a message 380 to the transaction controller 328. In one example, the transaction controller 328 is collectively implemented by a plurality of ME instances associated with a desired combo order. The ME instances may then receive the execute order request and initiate an atomic transaction to complete, for instance, a swap of a first asset for a second asset type. A representation of transactions completed by the transaction controller 328 may then be output as a market data message 382. The market data message 382 may then be output to one or more remote computer systems via the Combo order provisioning within an exchange system consistent with the present disclosure, e.g., exchange system 100/300, can be initiated via a comboOrderProvisioning message output by an IE instance such IE instance 390 of FIG. 3. The comboOrderProvisioning message may also be utilized to provide a status update to each combo order group, and more specifically, the ME instances that collectively provide a combo order group. The comboOrderProvisioning message may therefore also be referred to herein as a comboOrderStatus message.

Combo order provisioning refers to a distributed process whereby each ME instance associated with a combo order generates and/or updates an in-memory representation of a combo order. This provisioning can include an ME instance updating properties associated with a combo order in memory such as asset characteristics (e.g., PV, yield), current sequence ID, and/or current state(s) of associated ME instances. One such example provisioning process performed by ME instances is discussed further below with reference to FIGS. 4A and FIGS. 6A-6C. After provisioning of combo orders, order requests received by an exchange system consistent with the present disclosure may then be executed in connection with the provisioned combo order. In one example, a combo order transaction can only be initiated after a comboOrderProvisioning message has been output to, and acknowledged by, each associated ME instance.

To initiate combo order provisioning, an IE instance can output a comboOrderProvisioning message to a common data channel, e.g., common data channel 306, that is communicatively coupled to a plurality of ME instances (See FIG. 3).

The comboOrderProvisioning message is preferably implemented in a predetermined machine-readable format. More preferably, the comboOrderProvisioning message is a binary data structure that includes a plurality of bytes consecutively arranged from a first index N to a last index N+1 that can be sent via a single data packet, e.g., a multicast packet. The comboOrderProvisioning message output to the common data channel can have a maximum overall size in a range of 50 to 100 bytes, and preferably, a maximum overall size that is less than or equal to 90 bytes. One example implementation of a comboOrderProvisioning message consistent with the present disclosure is shown below in Table 2.

TABLE 2

| Field | Data Type | Description |
|---|---|---|
| message Type | Integer | Constant value indicating message is of type comboOrderProvisioning |
| comboOrderID | Integer | Unique identifier for each multi-leg order in system |
| firstMEState | Integer | State of first ME instance in combo group |
| secondMEState | Integer | State of second ME instance in combo order group |
| thirdMEState | Integer | State of third ME instance in combo order group |
| originatorInstanceID | Integer | Identifier of originating ME instance for message |
| messageOriginatorRole | Integer | Specifies role of message sender within a given set of associated ME instances for a combo order |
| threadID | Integer | Identifier of thread executing originating ME instance |
| sequenceID | Integer | Uniquely identifies message sequence for given transaction associated with a combo order |
| timestamp | Timestamp | Timestamp for message |
| firstLegYield | Integer | Yield of first leg of a combo order |
| firstLegPV | Integer | Present value of first leg of a combo order |
| secondLeg Yield | Integer | Yield of second leg of a combo order |
| secondLegPV | Integer | Present value of second leg of a combo order |

The message Type field can be an integer value that specifies the type of message being sent. For a comboOrderProvisioning, the message Type field can be set to a predetermined constant of 0x01, for example, or other value. Other example messageType values can be assigned to various other combo order message types as shown above in Table 1.

Note, other combo order-related messages can be defined including messages for canceling provisioning of a combo order within the system, e.g., after the sending of a comboOrderProvisioning message, requesting status of a combo order within the system, and transitioning the state of a provisioned combo order from a first state to a second state, e.g., from active to cancelled/de-provisioned, from active to suspended, and from suspended to active just to name a few.

The comboOrderID field preferably uniquely identifies a combo order within the system. The comboOrderID field preferably includes a value encoded in an array of bytes having a fixed length, e.g., one to eight bytes.

In one example, the comboOrderID can identify a multi-leg order for a swap of a 2-year benchmark for a 3-year benchmark (and vice-versa), or a multi-leg order for a swap of a 3-year benchmark for a 5-year benchmark (and vice versa).

Note, although various examples and scenarios herein refer to treasury benchmarks, this disclosure is not limited in this regard. Aspects and features of the present disclosure are equally applicable to other types of assets, e.g., synthetic and/or non-synthetic, that can be traded via a multi-stage/combo order process consistent with the present disclosure.

The firstMEState, secondMEState, and thirdMEState values can indicate the current state of each ME instance for a given combo order group. For example, the firstMEState and the secondMEState can represent the state of the ME instances associated with the first and second legs, respectively, in a combo order transaction. The thirdMEState can represent the state of an ME instance which has a synthetic asset order book for the given combo order group. Notably, each ME instance in a combo group can output the comboOrderProvisioning message, or another message that includes ME state values for members of the combo group, for purposes of providing state/status information to the other associated ME instances. Advantageously, this allows each ME instance to both report its own state and the last known state of the other associated ME instances for the combo order group. This can be particularly helpful for synchronizing states in a real time manner between a plurality of ME instances performing a combo order transaction consistent with the present disclosure.

Preferably, each multi-leg combo order type have a single associated comboOrderID within an exchange system consistent with the present disclosure, e.g., a single comboOrderID corresponding to a 2-year/3-year benchmark swap, a single comboOrderID corresponding to a 3-year/5-year benchmark swap, and so on.

Each comboOrderID may also be used to associate each ME instance assigned to a given combo order provisioned within the exchange system. For instance, and in the context of a 2-year/3-year benchmark swap, the comboOrderID may be associated with an identifier of a first ME instance that manages an order book for the 2-year benchmarks and an identifier of a second ME instance that manages an order book for the 3-year benchmarks. The comboOrderID may also further be associated with the identifier of a third ME instance that manages a combo or "synthetic" order book for the 2-year/3-year benchmark swap.

The association between the comboOrderID and the associated identifiers of ME instances for a provisioned combo order can be stored within a lookup table within memory, e.g., memory 203 (See FIG. 3). The lookup table stored in the memory may also be referred to herein simply as a lookup. In this example, the association between each comboOrderID and corresponding ME instances can be provisioned/instantiated based on a configuration file stored in the memory of an ME instance, one example of which is shown in FIGS. 11A-11E.

As discussed above, each combo group identifier can be unique and be used to associate the identifier of two or more corresponding ME instances for performing combo order transactions. Preferably, each combo group identifier is associated with at least three ME instances. For example, a combo group identifier for a 2-year/3-year benchmark swap can be associated with an identifier of a first ME instance that has an order book for 2-year benchmarks, an identifier of a second ME instance that has an order book for 3-year benchmarks, and an identifier of a third ME instance that has an order book for a synthetic asset that represents a combination of the 2-year and 3-year benchmarks. Accordingly, the combo group identifier may also be referred to herein as a triangle identifier, although combo group identifiers are not necessarily limited to three ME instances.

As discussed above, the lookup table in the memory of an ME instance may be provisioned/instantiated based on a configuration file stored in a memory of the ME instance. The combo order group configuration file can include a plurality of entries, with each entry of the plurality of entries associating a combo order group identifier with an identifier of a matching engine instance associated with a first leg of a combo order transaction and an identifier of a matching engine instance associated with a second leg of the combo order transaction. In one example, each entry can associate a combo group identifier with first, second and third ME instances.

For example, the configuration file shown in FIGS. 11A-11E includes a plurality of entries including a collection of ComboGroups. The configuration file of FIGS. 11A-11E may also be referred to herein as a combo order group configuration file. Each ComboGroup within the ComboGroups collection includes a plurality of properties, such as properties 1102. The properties for each ComboGroup can include a combo group identifier ("ComboGroupId") value for each combo group. The properties 1102 can further include a members collection, with each member of the members collection defining member properties, such as member properties 1106. The member properties can define the security/asset type associated with each member ("assetType"), the side of the transaction assigned to the member ("Side"), the leg ratio quantity ("LegRatioQty"), and a pricing target ("PricingTarget"), for example, As further shown in FIG. 11A, the example configuration file can further include an assets collection 1101 that associates each asset type with corresponding properties, such as properties shown at 1103. The properties of each asset can include, for example, an asset type identifier ("assetId") which includes a corresponding integer value that can uniquely identify an asset type within an exchange system, a secondary asset type identifier ("assetType") which can include a unique string value for the asset type, an assigned ME identifier ("meId"), and an assigned thread identifier ("threadId"). In the example of FIGS. 11A-11E, the secondary asset type identifier can be used as a key value for correlation between the combo group collection (see FIG. 11B) and asset collection (see FIG. 11A). For example, the properties 1106 in FIG. 11B for the first combo group in the collection includes a member with an assetType property set to "C_US02Y-US03Y." In this example, the asset collection 1101 shown in FIG. 11A includes an asset with an assetType property also set equal to "C_US02Y-US03Y." The asset properties for each member of a combo group may therefore be determined based on identifying a matching asset within the asset collection 1101 that has the same/matching assetType value.

An asset type defined in the properties 1006 of FIG. 11B for a given combo group may then be used to identify associated asset properties via the asset collection 1101 of FIG. 11A, including, for example, an asset type identifier ("assetId"), the identifier of the corresponding ME instance ("meId") for processing orders for the asset represented by the asset type identifier, and an assigned thread identifier ("threadId") for the ME instance. Notably, the assetType property can be a string representation of an asset to allow for scripting languages such as Python to more easily parse and perform lookups/correlations between combo groups and corresponding asset properties.

When provisioned using a configuration file such as the example configuration file shown in FIGS. 11A-11E, the lookup table may store data in a manner that correlates the combo members defined within the combo member collection discussed above with corresponding asset properties from the asset collection to avoid the necessity of performing additional lookups between combo groups and associated asset properties. This can include utilizing a relational table (e.g., a SQL table) to store combo group properties and associated asset properties.

In operation, the lookup table allows for an ME instance to identify the members of a combo group based on the comboGroupID within a received comboOrderProvisioning message. In response to the identified members including an ID equal to the identifier assigned to the ME instance (e.g., equal to the meID value assigned via the configuration file of FIG. 10A), the ME instance may then execute a process to cause provisioning of the combo order within the ME instance's memory, or to indicate that the combo order cannot be provisioned, as the case may be. On the other hand, the ME instance can ignore the received comboOrderProvisioning message based on a query of the lookup table indicating that none of the ME member instances associated with the comboGroupID have an associated identifier equal to the ID (meID) assigned to the ME instance. In this scenario, the ME instance can avoid further processing of the received comboOrderProvisioning message and the associated resource use (e.g., processor and memory usage), which thus can minimize or otherwise reduce the potential introduction of processing latencies that could negatively impact performance of the ME instance.

In the context of the ME identifying that the members of the combo group have an ID equal to the identified assigned the ME instance, the ME instance can further determine its assigned role (e.g., buy side, sell side) based on the lookup table in memory.

Note, the comboOrderProvisioning message can include the identifier of each ME instance associated with a combo group as an alternative, or in addition to, the combo group identifier value. In this example, the ME instance may determine the identifiers of the ME instances associated with the combo order based on the received comboOrderProvisioning message without necessarily performing a query using the lookup table within the memory. However, including the identifier of each ME instance within the comboOrderProvisioning message can cause the comboOrderProvisioning message to have an increased memory footprint (e.g., an additional 4-20 bytes for each ME instance identifier and optional role value), and potentially longer transmission times between ME instances.

Continuing the discussion of the example comboOrderProvisioning message shown in Table 2, the originatorInstanceID may be set equal to the identifier of the IE/ME instance sending/outputting the message to the broadcast group 406. Preferably, each of the message types associated with combo orders (e.g., see Table 1 above) include the originatorInstanceID field. The originatorInstanceID field can be used to logically identify a ME/IE instance. This allows for each IE/ME instance receiving the combo-order related messages to determine which IE/ME instance a message originated from using the logical identifier, which is to say without necessarily inspecting information outside of the data layer (OCI layer 4) such as address information within the IP header (OCI layer 3) to identify the originator of a message. Accordingly, two or more ME/IE instances can send and receive messages via a same channel, e.g., broadcast group 406, and originator identification can be performed via a read of a relatively small number of bytes within a received message that represent the originatorInstanceID, e.g., eight or less bytes, preferably four or less bytes.

Thus, IE/ME instances can avoid unnecessary memory operations beyond review of the originatorInstanceID field within a given combo order message to determine where, e.g., which ME instance, the combo order message originated from. Likewise, this permits IE/ME instances to share IP addresses and associated network resources rather than requiring that each IE/ME instance have a separate/distinct IP/Port assignment.

The firstLegYield field and firstLegPV field of a comboOrderProvisioning message (see Table 2 above) can identify a current yield value and present value for the asset/instrument associated with the first leg of the combo order. In one example, this can include the yield value and the present value for a 2-year benchmark. The yield value and/or the present value can be determined based on orders within an order book for the same. For example, the ME instance that manages an order book for the 2-year benchmarks can be queried via an API message by an IE instance, to determine the yield value and the present value (e.g., based on the top order within the order book). Alternatively, or in addition, the yield value and/or present value can be determined based on a price/order message that is output by the ME instance during processing of orders. The price/order message may also be referred to herein as market data update messages or simply market data messages. The price/order messages may be output based on trades executed by the ME instance and/or based on changes to one or more trades in an associated order book (e.g., insertion of new orders, updates to existing order, removal/deletion of orders).

The ME instance can output price/order messaging to the common data channel 306 (See FIG. 3), for example. Note, the yield value and/or present value can also be determined without necessarily requiring network communication. For example, an IE instance may determine the yield value and/or present value via a shared memory approach that can allow an IE instance consistent with the present disclosure to retrieve the yield value and/or present value from the corresponding order book via a shared memory operation. In any such cases, the IE instance can set the yield value and first leg present value based on data within the order book of the corresponding ME instance.

Likewise, the secondLegYield value and the secondLegPV value of the comboOrderProvisioning message can correspond to the asset/instrument associated with second leg of the combo order, and in particular, with the ME instance that has the assigned role of the second leg for the combo order. The secondLegYield value and the secondLegPV value may be determined using the same approach discussed above with regard to the firstLegYield and secondLegYield values, the description of which will not be repeated for brevity.

Figure 4A:
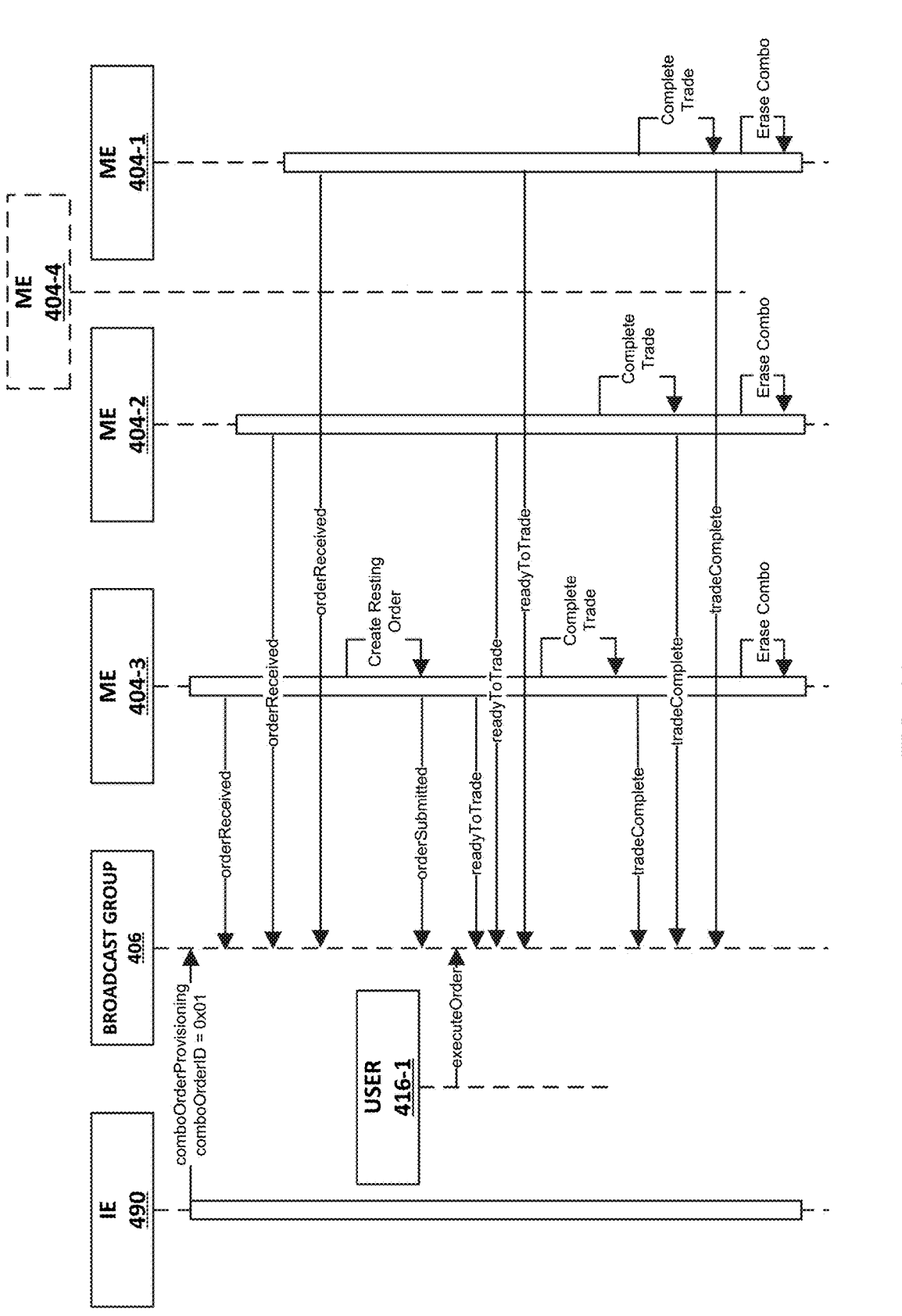
FIG. 4A shows an example process flow for provisioning of a combo order consistent with the present disclosure.

FIG. 4A shows an example of a protocol flow for combo order provisioning and order processing consistent with aspects of the present disclosure.

As shown, a plurality of MEs including a first ME 404-1, a second ME 404-2, and a third ME 404-3 that are communicatively coupled to a broadcast group 406. As previously discussed, each ME instance of the plurality of ME instances can be implemented via a separate thread/processor of the same computer or via a plurality of different computer systems coupled together via a data network.

The broadcast group 406 may be implemented as the common data channel 306 discussed above with reference to FIG. 3. The IE instance 490 can be implemented by an ME instance, e.g., a controller of ME instance 404-1 such as controller 201 of FIG. 2, or via a dedicated processor/system.

As shown, the IE instance 490 can send/output a comboOrderProvisioning message to the broadcast group 406. This can include, for example, IE instance 490 sending a multicast packet that includes the comboOrderProvisioning message within a payload of the same. One example format for the comboOrderProvisioning message is discussed above with reference to Table 2.

Each of the first ME instance 404-1, the second ME instance 404-2, and the third ME instance 404-3 may then receive the comboOrderProvisioning message via the broadcast group 406. Preferably, this is based on each of the ME instances being subscribed to a same channel, such as a first multicast group, which allows the IE instance 490 to communicate with N number of ME instances via a single message.

As discussed above, each ME instance can determine if the comboOrderProvisioning message is directed/targeted to their particular ME instance based on, for example, querying the lookup table in memory using the comboOrderID value provided in the comboOrderProvisoning message. In the example of FIG. 4A, this can include lookup table indicating that the comboOrderID value of 0x01 is associated with a plurality of ME instance members, namely first, second and third ME instances 404-1, 404-2, 404-3. The lookup table can also further indicate the identifier for each of the ME instances 404-1, 404-2, 404-3 associated with the combo order, and respective roles.

In response to a ME instance receiving a comboOrderProvisioning message directed to their particular ME instance (e.g., based on querying the lookup table as discussed above), the ME instance may then initiate a combo order provisioning process consistent with the present disclosure, which may also be referred to herein as simply a provisioning process. Preferably, each comboOrderProvisioning message is output as a single message to a plurality of ME instances, e.g., via a multicast packet, and is configured to cause each receiving ME instance associated with the combo order identified within the comboOrderProvisioning message to initiate a provisioning process in parallel/concurrently with each other. The combo order identifier within the comboOrderProvisioning message may also be referred to herein as a combo order transaction identifier.

In one example, this can include each receiving ME instance setting a value in memory, e.g., one or more bits, to transition a current state value from a suspended/idle state (e.g., 0x0) to a provisioning state (e.g., 0x01). Likewise, each ME instance can maintain a table in a memory, e.g., within the database 205 of the memory 203 (see FIG. 2), with an entry for each ME instance associated with a combo order. Each of the entries within the table in the memory can further associate each ME instance with a corresponding instance ID and role value. One example of the table for maintaining ME instance states is shown below in Table 4.

When combo order provisioning is completed by an ME instance, the ME instance can set a value in memory (e.g., one or more bits) to transition the current (local) state value from the provisioning state (e.g., 0x1) to a provisioned state specified value, which in the context of treasury benchmarks can include a guaranteed yield, present value, and ratio of units to be swapped.

Following creation of the resting order, the ME instance with the synthetic asset role, e.g., the third ME instance 404-3 in the example of FIG. 4A, can output an orderSubmitted message to the broadcast group 406. One example format for the orderSubmitted message is shown below in Table 3.

TABLE 3

| Field | Value | Description |
|---|---|---|
| message Type | Int (0x06) | orderSubmitted message type |
| comboOrderID | Integer | Identifier of combo order |
| originatorInstanceID | Integer | Identifier of originating ME instance for message |
| sequenceID | Integer | Uniquely identifies message sequence for given transaction associated with a combo order |
| timestamp | Timestamp | Timestamp for message |

(e.g., 0x02). Each ME instance can output an orderReceived acknowledgement message to the other ME instances after combo order provisioning is completed. As shown in the example of FIG. 4A, this acknowledgement message can include each ME instance outputting an orderReceived message to the broadcast group 406. One example format for the orderReceived message is shown below in Table 7. Preferably, the orderRecieved message is output by each ME instance to the broadcast group as a packet, such as a multicast or UDP packet.

The ME instance with the synthetic asset role, e.g., the third ME instance 404-3 in the example of FIG. 4A, may then create/generate a resting order in memory after receiving an orderReceived message from each of the corresponding ME instances, e.g., the first and second ME instances 404-1, 404-2. The resting order in memory preferably includes a representation of one or more characteristics/properties of the corresponding combo order including, for example, an identifier of the first type of asset associated with the first leg of the combo order, and an identifier of the second type of asset associated with the second leg of the combo order. The resting order in memory can further include a representation of the yield and/or present value for the first type of asset of the first leg, and a representation of the yield and/or present value for the second type of asset of the second leg. Creation of the resting order in memory can include the ME instance 404-3 inserting the resting order into an order book. The resting order can be aggressed by users of the exchange to execute an order in connection with the provisioned combo order.

In the example of the provisioned combo order being a 2-year/3-year benchmark swap, the third ME instance 404-3 may insert into the corresponding order book a first item to execute a swap of X units of a 2-year benchmark for an equivalent number of units of a 3-year benchmark, and a second item to execute the opposite, namely a swap of X units of the 3-year benchmark for an equivalent number of 2-year benchmark units. In either case, orders executed against these items can cause a multi-leg, distributed transaction to occur across the ME instances associated with the combo order. As discussed below, this multi-stage, distributed transaction is advantageously able to execute an order across ME instances without "slippage" in an atomic fashion such that orders are guaranteed to be completed at the The orderSubmitted message can be used to cause each ME instance to update a state value in memory that is associated with the other (remote) ME instances. For example, the state value may be stored within an entry of a table stored within the database 205 of FIG. 2. Note, the orderReceived messages may also be used for purposes of updating local memory of each ME instance to represent a state of (remote) associated ME instances. One such example in-memory table for state management/tracking by each ME instance is shown below in Table 4:

TABLE 4

| comboOrderID | meID | role | state |
|---|---|---|---|
| 0x01 | 0x01 (e.g., ME instance 404-1) | 0x02 (first leg ME role) | 0x02 (provisioned) |
| 0x01 | 0x02 (e.g., ME instance 404-2) | 0x03 (second leg ME role) | 0x02 (provisioned |
| 0x01 | 0x03 (e.g., ME instance 404-3) | 0x01 (synthetic asset role) | 0x02 (provisioned) |

Note, the in-memory state structure for an ME instance can include multiple different combo orders provisioned within the same. For instance, the first ME instance 404-1 may manage an order book for 2-year benchmarks and be associated with a first combo order (e.g., comboOrderID=0x01) for a 2-year/3-year benchmark swap, and a second combo order (e.g., comboOrderID=0x02) for a 2-year/5-year benchmark swap. The first ME instance 404-1 in this example would therefore have each of the first and second combo orders represented by entries of a table in memory, e.g., similar, or identical to the example shown below in Table 5. Entries of the table in memory for each ME instance having a state value set to "provisioned", e.g., 0x02, may therefore represent provisioned combo orders for the ME instance. Those combo orders which are not in a provisioned state are preferably prevented from being aggressed/executed by the ME instance. Combo order messages received by an ME instance that identify a combo order which is not provisioned in the memory, such as shown in Table 5, are preferably rejected by the ME instance, e.g., with a negative acknowledgement message (NAK), or ignored.

In another example, a given ME instance may be assigned a first leg ME role for a first combo order and a second leg ME role for a second combo order. By way of illustration, consider the prior example where the first ME instance 404-1 manages an order book for 2-year benchmarks. The first ME instance 404-1 may therefore be assigned a first leg ME role for the first combo order (e.g., comboOrderID=0x01) that includes selling a specified amount of 2-year benchmarks to perform a desired swap to a different asset type (e.g., a 3-year benchmark), and be assigned a second leg ME role for a second combo order (e.g., comboOrderID=0x02) that includes buying a specified amount of 2-year benchmarks to perform a desired swap of a different asset (e.g., a 5-year benchmark). Table 5 shown below provides one example of the in-memory table that can be implemented by the first ME instance 404-1 for the preceding scenario:

TABLE 5

| comboOrderID | meID | role | state |
| --- | --- | --- | --- |
| 0x01 | 0x01 (ME instance 404-1) | 0x02 (first leg ME role) | 0x02 (provisioned) |
| 0x01 | 0x02 (ME instance 404-2) | 0x03 (second leg ME role) | 0x02 (provisioned) |
| 0x01 | 0x03 (ME instance 404-3) | 0x01 (synthetic asset role) | 0x02 (provisioned) |
| 0x02 | 0x01 (ME instance 404-1) | 0x02 (first leg ME role) | 0x02 (provisioned) |
| 0x02 | 0x04 (ME instance 404-4) | 0x02 (second leg ME role) | 0x02 (provisioned) |
| 0x02 | 0x05 | 0x03 (synthetic asset role) | 0x03 (provisioned) |

Likewise, the in-memory state structure can optionally include additional values such as a yield and present value associated with the first and second leg ME instances depending on a desired configuration. In any such cases, each ME instance can therefore have N number of combo orders provisioned during operation/runtime based on a provisioning process consistent with the present disclosure. In addition, an exchange system consistent with the present disclosure avoids the necessity of a centralized controller for state management of combo order provisioning and processing, and instead achieves a distributed state whereby each IE/ME instance associated with a combo order has an in-memory representation of a current state and assigned properties for each of the other IE/ME instances (e.g., instance ID and role value).

TABLE 6

| Field | Value | Description |
| --- | --- | --- |
| message Type | Int (0x05) | orderReceived message type |
| comboOrderID | Integer | Identifier of combo order |
| originatorInstanceID | Integer | Identifier of originating ME instance for message |
| sequenceID | Integer | Uniquely identifies message sequence for given transaction associated with a combo order |
| timestamp | Timestamp | Timestamp for message |

Each ME that receives the orderReceived message from the other ME instances via the broadcast group 406 can update their respective in-memory state structure/table accordingly. For example, the first ME instance 404-1 can use the received orderReceived message output by the second ME instance 404-2 to update an entry of the table in memory to reflect that the state of the second ME instance 404-2 is now set to provisioned, e.g., 0x02, as shown above in the example of Table 5.

Notably, other ME instances, such as a fourth ME instance 404-4, may be communicatively coupled to the broadcast group 406 and can receive the comboOrderProvisioning message from the IE instance 490 as well as other combo order messages such as orderReceived/ACK messages from the first, second and third ME instances 404-1, 404-2, 404-3. In this scenario, the fourth ME instance 404-4 may not be associated with the combo order identified within the comboOrderProvisioning message (comboOrderID=0x01) shown in the example of FIG. 4A. By way of example for clarity and not for purposes of limitation, consider a scenario where the first, second and third ME instances 404-1, 404-2 and 404-3 are associated with a 2-year/3-year benchmark swap, while the fourth ME instance 404-4 is configured to maintain an order book for 5-year benchmarks. In this scenario, the fourth ME instance 404-4 may determine that the various combo-related messages (see Table 1) output by the IE instance 490 and/or the first, second and third ME instances 404-1, 404-2, 404-3 can be ignored based on, for example, a lookup table in memory that indicates the fourth ME instance 404-4 is not associated with the combo order identified within the comboOrderProvisioning message. This can include, for example, the fourth ME instance 404-4 querying the lookup table based on the comboOrderID of 0x01 to determine the associated ME instance identifiers. The fourth ME instance 404-4 may then simply compare its own assigned identifier to each ME instance identifier associated with the comboOrderID of 0x01, and based on none of the ME instance identifiers being equal to the identifier assigned the fourth ME instance, the fourth ME instance can ignore the comboOrderProvisioning message.

In this example, ignoring messages by the fourth ME instance 404-4 can include performing a minimal amount of memory operations (e.g., reads, new memory allocation) to inspect/review only the bytes representing the comboOrderID value and perform lookups as discussed above. In another example, ignoring messages by the fourth ME instance 404-4 can include hardware/firmware level logic to identify that the received message is not targeting the fourth ME instance 404-4 and, in response to determining the message should be ignored, preventing a received message from being copied from kernel space/hardware to a secondary memory space such as user space in which program code is executed. In any such cases, this approach advantageously minimizes or otherwise reduces unnecessary resource con-sumption (processor and/or memory operations) by the fourth ME instance 404-4 while allowing for ME instances associated with two or more different and distinct combo orders to share the broadcast group 406.

As shown in the example of FIG. 4A, any one of the ME instances associated with a provisioned combo order can be the first to receive and process the executeOrder message. In the example of FIG. 4A, the third ME instance 404-3 received and processed the executeOrder message from a user computer device 416-1 before the other associated ME instances. The particular order of which ME instances receive and process executeOrder messages can vary and is not fixed given the distributed nature of the ME instances as well as potentially other factors such as the current order workflow load of each ME instance and the relative difference in signal propagation time to transmit signals to each ME instance.

The executeOrder message can be received from a user by an API, such as from a user via signal 118-2 and the API gateway 110 shown in FIG. 1. One example format for the executeOrder message is shown below in Table 7.

TABLE 7

| Field | Value | Description |
|---|---|---|
| message Type | Int (0x09) | executeOrder message type |
| comboOrderID | Integer | Identifier of combo order |
| orderDetails | Array of bytes | Order details for transaction including, e.g., amount to sell by first leg ME instance at target price and amount to buy by second leg ME instance at target price |
| sequenceID | Integer | Uniquely identifies message sequence for given transaction associated with a combo order |
| timestamp | Timestamp | Timestamp for message |

In response to receiving the executeOrder message directed to a provisioned combo order, each receiving ME instance can perform a validation/verification on whether the order can be satisfied. The executeOrder message may also be referred to herein as a request to execute a combo order transaction. In one example, the executeOrder message can include at least a quantity value, and validation can include the ME instance determining that at least one order within the order book has an available quantity equal to or greater than the quantity value provided within the executeOrder message, as will be discussed in further detail below. The particular target price for the quantity value identified in the executeOrder message can be determined by the ME instance based on, for example, querying the lookup table in memory to identify target/defined properties for the combo order transaction. The request to execute the combo order transaction is preferably a packet having an overall size in a range of 20 to 100 bytes.

Of course, this validation/verification occurs preferably after each ME instance has identified that the executeOrder message is directed to a combo order that has been provisioned in their memory, as discussed above. This first-stage check may also be referred to herein as a combo provisioning check. The combo provisioning check preferably includes each ME instance receiving the executeOrder message and identifying that the same is directed to a combo order provisioned in their memory, e.g., based on the lookup table discussed above. In the event that an ME instance determines that the comboOrderID within the executeOrder message is directed to their particular ME instance, the ME instance can perform an order validation check prior to or after locking of a respective order book as discussed further below. On the other hand, and in the event an executeOrder message is not directed to a combo order associated/assigned to the ME instance, that message can be ignored by the ME instance to minimize or otherwise reduce unnecessary computer resource usage.

In the example of FIG. 4A, each of the first, second and third ME instances 404-1, 404-2, 404-3 respectively transitions an associated order book to a locked state after receiving the executeOrder message via the broadcast group 406. Transitioning the order book to a locked state can cause order processing to be halted/suspended for a predetermined maximum interval of time. This predetermined maximum interval of time may also be referred to as a maximum transaction period. When the order book is in a locked state, order processing unrelated to the combo order transaction such as insertion of new orders and updates to existing orders within an order book is prevented by the ME instance. Preferably, the maximum interval of time that suspension of order processing occurs by each ME instance, e.g., the maximum amount of time between transitioning the order book from the unlocked state to the unlocked state for combo order transaction processing, is in a range of 5 to 500 microseconds, and more preferably, in a range of 5 to 100 microseconds.

Thus, the executeOrder message is preferably configured to cause each ME instance associated with the corresponding combo order to transition their operating state from a normal state to a combo order transaction state during which the normal order work flows (e.g., insertion of orders into an order book, matching of orders, execution of orders) is suspended/halted. Such "normal" order workflow may also be referred to herein as simply order processing for ease of description. For instance, in a scenario where the first and second ME instances 404-1, 404-2 are assigned the first and second leg roles, respectively, the received executeOrder message is preferably configured to cause a halt in order processing by each ME instance for a period of time no greater than the maximum transaction period discussed above. Thus, a single executeOrder can be output to the broadcast group 406 to cause N number of ME instances to transition to a combo order transaction state and lock respective order books for the maximum transaction period. Preferably, each of the ME instances have a clock synched via the clock controller 108 (See FIG. 1) such that each ME instance has a current time value within 25±5 microseconds of the other ME instances or less. Each of the ME instances corresponding to a combo order can transition into the combo order transaction state and maintain a lock on respective books in a synchronized fashion for a period of time less than or equal to the maximum transaction period prior to transitioning back to the normal state, e.g., to unlock an order book. In one example, this can include utilizing the timestamp value in the executeOrder message as a reference. For instance, each ME instance can determine when the maximum transaction period has been reached based on using the timestamp value in the executeOrder message as T0 and determining if the difference between current time T1 and T0 exceeds the maximum transaction period.

Continuing on, transitioning to the combo transaction state can include determining that the order represented within the executeOrder message can be executed/satisfied as discussed above. This can include the ME instance broadcast group 406 to cause the other ME instances associated with the combo order to roll back the transaction.

TABLE 8

| Field | Value | Description |
|---|---|---|
| message Type | Int (0x07) | readyToTrade message type |
| comboOrderID | Integer | Identifier of provisioned combo order |
| originatorInstanceID | Integer | Identifier of originating ME instance for message |
| sequenceID | Integer | Uniquely identifies message sequence for given transaction associated with a combo order |
| timestamp | Timestamp | Timestamp for message | associated with the first leg ME role determining that there is an available amount of a specified first asset type available in a respective order book at the price specified by the provisioned combo order to sell and complete the first leg of the combo order. Likewise, the ME instance associated with the second leg ME role can also determine that there is an available amount of a specified second asset type available in a respective order book at the price specified by the provisioned combo order to buy and complete the second leg of the combo order. Of course, multiple orders within each respective book may be used to satisfy an order. However, the specific orders selected from each order book by the first and second leg ME instances to satisfy an order must comport with expected/guaranteed characteristics for the transaction such as yield and ratio.

Transitioning to the combo transaction state by an ME instance can further include identifying at least one action to perform on the order book during execution of a combo order transaction. The at least one action can include, for example, generating one or more provisional trades in memory, modifying one or more orders in the order book, and provisionally executing trade(s) in memory based on or more orders in the order book that satisfy a leg of the combo order transaction. Additional provisional changes in memory by an ME instance during a combo order transaction can include the generation of market data update messages based on the one or more provisional trades and/or ledger updates. Each ME instance associated with the combo order transaction can identify the least one action to perform based on an assigned role for the combo order transaction. As discussed above, an ME instance can include a lookup table stored in memory to determine a respective role for the combo order transaction such as a first leg role or a second leg role. In the example of FIG. 4A, the first ME instance 404-1 may then use the determined role value as an indication that the first ME instance 404-1 is associated with a first leg of the combo order transaction to sell a predetermined amount of a first asset type via one or more orders within the respective order book, and the second ME instance 404-2 may then use the determined role value as an indication that the second ME instance 404-2 associated with the second leg of the combo order transaction to buy a predetermined amount of a second asset type via one or more orders within the respective order book. Note, legs of a combo order transaction may be performed by respective ME instances in any order, and preferably, concurrent with each other.

Continuing, each ME instance may then output a ready ToTrade message to the broadcast group 406 if the order represented in the executeOrder message can be executed. Table 8 shows one example format below for the ready-ToTrade message. Otherwise, each ME instance can output a negative acknowledgement message (not shown) to the As further shown in FIG. 4A, each ME instance can receive a ready ToTrade message from the other ME instances corresponding to the combo order specified within the executeOrder message. Each ME instance may then determine that a ready ToTrade message was received from all other corresponding ME instances, and in response thereto, perform the one or more actions discussed above in order to complete trade(s) in connection with their assigned role. In one example, such as shown in FIG. 4A, each ME instance may determine that a ready ToTrade message was received from at least two other ME instances associated with the combo order transaction prior to performing the one or more actions.

Note, each ME instance may perform all or some of the at least one actions prior to receiving a ready ToTrade message from other ME instances associated with the combo order transaction. For example, a ME instance may generate the at least one provisional trade in memory and/or market data update message(s) in memory in response to receiving the executeOrder message rather than waiting for one or more readyToTrade messages to be received. Thus, each ME instance may perform one or more of the at least one identified actions after receiving the executeOrder message, e.g., without waiting for ready ToTrade message(s) to be received from other ME instances associated with the combo order transaction, and one or more of the at least one identified actions after receiving ready ToTrade message(s). For instance, and as shown in the example of FIG. 4A, provisional changes can be generated in memory by the first ME instance 404-1 after receiving the executeOrder message and prior to receiving ready ToTrade messages from the second and third ME instances 404-2, 404-3. The first ME instance 404-1 may then receive a ready ToTrade message from the second ME instance 404-2 and the third ME instance 404-3, and in response thereto, perform any remaining actions for the combo order transaction such as transitioning provisional memory changes such as provisional order(s) and/or updates to the order book to a committed state. Still further actions can include outputting market data updates to reflect executed trade(s) and/or other changes to the order book.

In any such case, any change in the memory by a ME instance during a combo order transaction, such as generating the one or more provisional trades, generating market data update messages, and/or modifying one or more orders in the order book is preferably initially set to an uncommitted state based on one or more bits in memory being set to a first predetermined value (e.g., 0x0). Such memory can be rolled back in the event the combo order transaction fails. For instance, an ME instance can determine that one or more ready ToTrade messages from the other ME instances associated with a combo order transaction was not received within a predetermined period of time after receiving the executeOrder request. As discussed above, the executeOrder request can include a timestamp value, and a ME instance may determine the predetermined period of time has elapsed based on a difference between current time (T1) and the timestamp value (T0). The predetermined period of time can be in a range of 25 to 100 microseconds, and more preferably 50±10 microseconds, for example. In this scenario, the ME instance may then determine the predetermined period of time has elapsed without a ready ToTrade message being received from one or more of the other ME instances associated with the combo order transaction and, in response thereto, execute a rollback.

The rollback can include, for example, deleting/removing the memory representing the provisional changes, e.g., via garbage collection, or otherwise invalidating the same to allow for overwriting/re-use. Preferably, the ME instance transitions from the combo order transaction processing state to the normal processing state, e.g., by transitioning the order book from the locked state to the unlocked state, following the rollback to continue normal order processing. In addition, the ME instance may output a cancel Trade message to the broadcast group 406 based on determining the transaction failed, with the cancelTrade message being configured to cause one or more of the ME instances associated with the combo order transaction to execute a rollback and unlock respective order books to continue normal order processing. Further details and examples of this scenario are discussed below with reference to FIG. 4B.

On the other hand, if the combo order transaction succeeds, e.g., each ME instance associated with the combo order transaction receives a ready ToTrade message from the other ME instances associated with the combo order transactions such as shown in the example of FIG. 4A, each ME instance may then transition the provisional memory changes such as the at least one provisional trade in memory to a committed state. Preferably, each ME instance associated with a combo order transaction receives at least two readyToTrade messages from other ME instances associated with the combo order transaction within a predetermined instance 404-1 and the third ME instance 404-3 before completing/finalizing the second leg of the trade by buying an amount of a second asset/instrument based on the executeOrder message. Finally, the third ME instance 404-3 may therefore wait until a ready ToTrade message is received from the first ME instance 404-1 and the second ME instance 404-2 before completing/finalizing any provisional trades in memory. Accordingly, the ready ToTrade message can be output by each ME instance to indicate that the same is in a synchronized state for the combo order transaction, e.g., that an order book has been transitioned to a locked state and will remain in the locked state until a predetermined condition occurs such as the maximum transaction period elapsing and/or a ME instance associated with the combo order transaction outputs a negative acknowledgement (e.g., a cancelTrade message).

Accordingly, a plurality of ME instances can synchronize updates/finalization of provisional memory changes with each other to complete a combo order transaction in an atomic fashion. This ensures that respective order books of the ME instances remain in the locked state during the combo order transaction and that a sequence of actions/ updates can occur across the order books to satisfy/complete the legs of the combo order transaction without the potential of an intervening order book change, e.g., slippage, to occur due to processing of an order/trade unrelated to the combo order.

Each ME instance may then output a tradeComplete message to the broadcast group 406 after receiving ready ToTrade message(s) from ME instances associated with the combo order transaction and finalizing provisional memory changes as discussed above. One example format for the tradeComplete message is shown below in Table 9. In one example, each ME instance transitions from the combo order transaction state to the normal state to unlock a respective book prior to or after output of the tradeComplete message to the broadcast group 406. Subsequent to output of the tradeComplete message, each ME instance can erase/ remove the provisioned combo message from memory associated with the executeOrder message.

TABLE 9

| Field | Value | Description |
|---|---|---|
| message Type | Int (0x08) | tradeComplete message type |
| comboOrderID | Integer | Identifier of provisioned combo order |
| originatorInstanceID | Integer | Identifier of originating ME instance for message |
| sequenceID | Integer | Uniquely identifies message sequence for given transaction associated with a combo order |
| timestamp | Timestamp | Timestamp for message | period of time before finalizing/committing any provisional changes in memory, e.g., prior to the maximum transaction period elapsing based on the timestamp value included within the executeOrder message as discussed above.

Figure 4B:
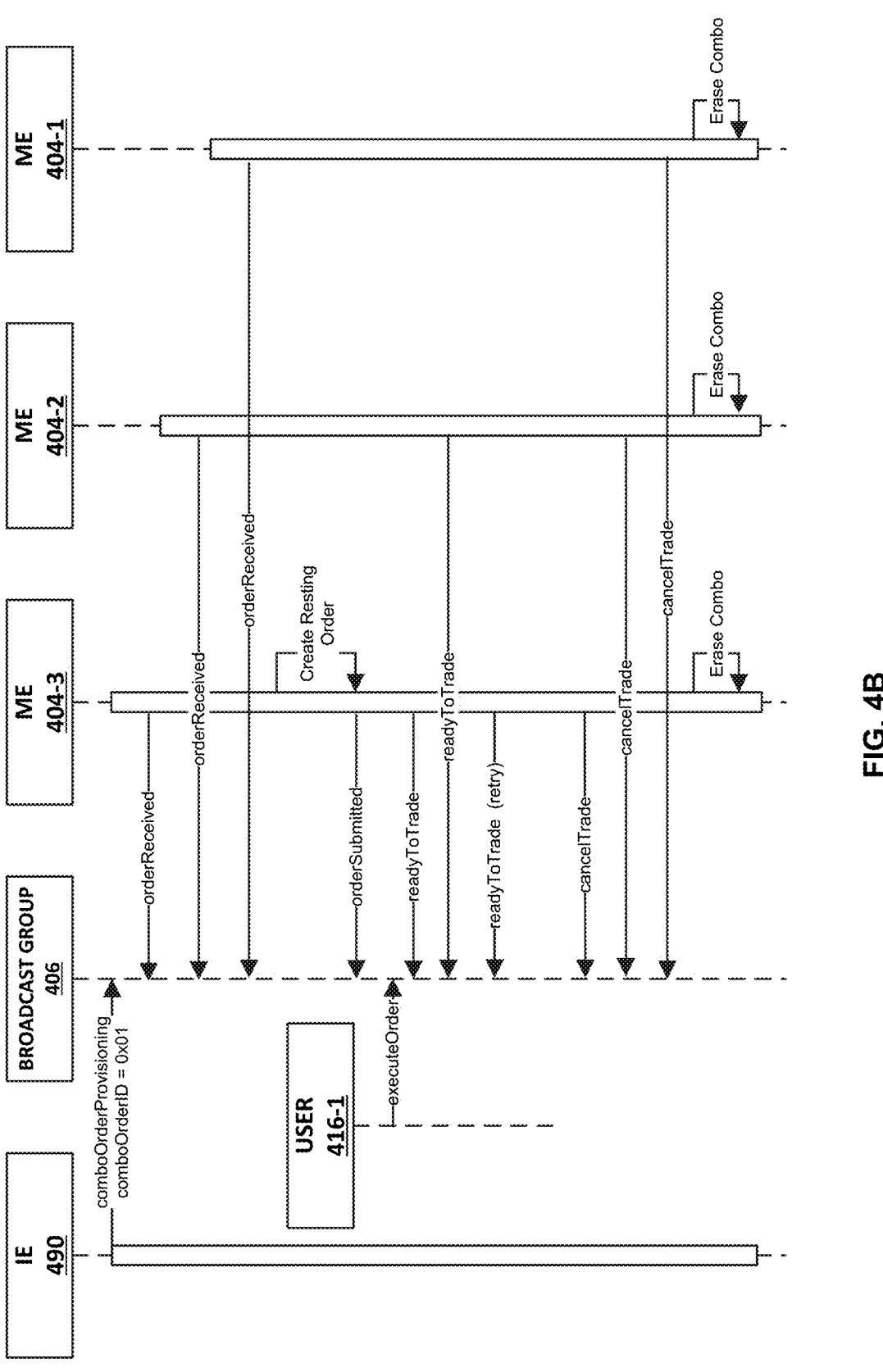
FIG. 4B shows another example process for provisioning a combo order consistent with the present disclosure.

For example, consider a scenario where the first ME instance 404-1 is assigned a first leg role, the second instance 404-2 is assigned a second leg role, and the third ME instance 404-3 is assigned the synthetic asset role. The first ME instance 404-1 may therefore wait until a readyToTrade message is received from the second ME instance 404-2 and the third ME instance 404-3 before completing/ finalizing the first leg of the trade by selling an amount of a first asset/instrument based on the executeOrder message. Likewise, the second ME instance 404-2 may therefore wait until a ready ToTrade message is received from the first ME FIG. 4B shows another example process flow for combo order provisioning and processing in accordance with the present disclosure. As shown, the example process flow of FIG. 4B is substantially identical to the process flow of FIG. 4A. However, the process flow of FIG. 4B illustrates a scenario where the first ME instance 404-1 fails to respond to the executeOrder message output to the broadcast group. In this scenario, one or more of the other ME instances, such as the third ME instance can determine that a predetermined timeout period has elapsed. The predetermined timeout period may be measured from, for example, when the executeOrder message was received or from when a ME instance has output a ready ToTrade message. In the example of FIG. 4B, the third ME instance 404-3 determined that the timeout period elapsed without a ready ToTrade message being received from the first ME instance 404-1. The third ME instance 404-3 may then output another ready ToTrade message (also referred to herein as a retry readyToTrade message) to the broadcast group 406 based on the predetermined timeout threshold being exceeded. The second ME instance 404-2 can receive the retry ready ToTrade message, and in response, optionally output a retry ready ToTrade message to the broadcast group 406 as well. The third ME instance 404-3 may repeat this retry process N times until a maximum number of retries is reached, the maximum transaction period elapses, and/or the first ME instance 404-1 responds, e.g., with a ready ToTrade or cancelTrade message. The particular maximum number of retries can be variable, e.g., 3-5 retries, depending on a desired configuration. Once the maximum number of retries has been reached, the third ME instance 404-3 can output a cancelTrade message to the broadcast group 406. One example format for the cancel Trade message is shown below in Table 10. Each ME instance for the combo order can receive the cancel Trade message and acknowledge the same by, for example, outputting a cancel Trade message to the broadcast group 406, as shown.

The cancel Trade message can cause each receiving ME instance to transition from the combo order transaction state to the normal state to unlock a respective book and resume normal order processing. The cancelTrade message can cause each receiving ME instance to deactivate/deprovision the corresponding combo order from memory. The first ME instance 404-1 may ultimately attempt to send message(s) (not shown) pertaining to the cancelled combo order without necessarily receiving the cancel Trade message. In this instance, all messages output to the broadcast group 406 by the first ME instance 404-1 that include an identifier of the cancelled combo order can be ignored by the other ME instances or responded to with a negative status of "unknown." Accordingly, the first ME instance 404-1 can utilize the negative response to clear the combo order from memory and can transition from the combo order transaction state to the normal state.

Note, a similar retry sequence as defined above can occur at other stages of combo order provisioning and processing. For example, the IE instance 490 may determine that an orderReceived message was not output within a predetermined period of time by one or more ME instances associated with a combo order after a comboOrderProvisioning message for the same was output by the IE instance 490 to the broadcast group 406. In this example, the IE instance 490 may perform N retries by re-sending the comboOrderProvisioning message to the broadcast group 406.

can be executed by a controller of an IE instance consistent with the present disclosure. One such example controller suitable for use is controller 201 shown in FIG. 2. In act 502, the controller derives a first combo order, with the first combo order having an associated combo order ID that uniquely identifies the same within an exchange system. In act 504, the controller identifies target ME instances associated with the first combo order. The target ME instances can include at least a first ME instance for a first leg of the combo order, and a second ME instance for a second leg of the combo order. In addition, the target ME instances can further include a third ME instance that manages a synthetic asset order book associated with the first combo order. In act 506, the controller causes the first combo order provisioning message to be output to the target ME instances. Preferably, the controller causes the first combo order provisioning message to be output to the target ME instances via a packet output to a shared/common communication channel such as a multicast group or UDP broadcast group, for example. The process 500 then ends.

Figure 6A:
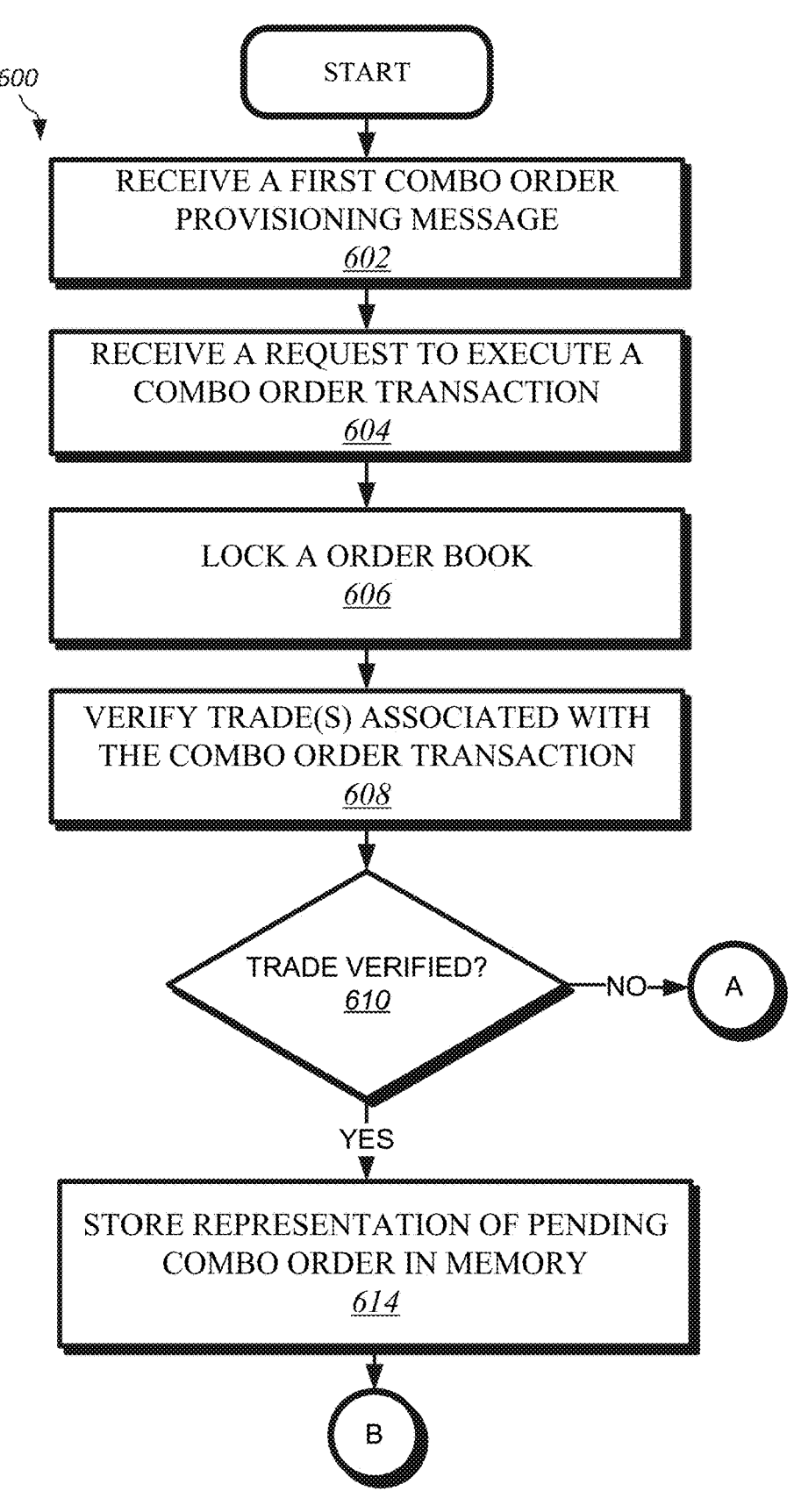
FIGS. 6A-6C shows an example process for provisioning of a combo order by an ME instance consistent with aspects of the present disclosure.
Figure 6B:
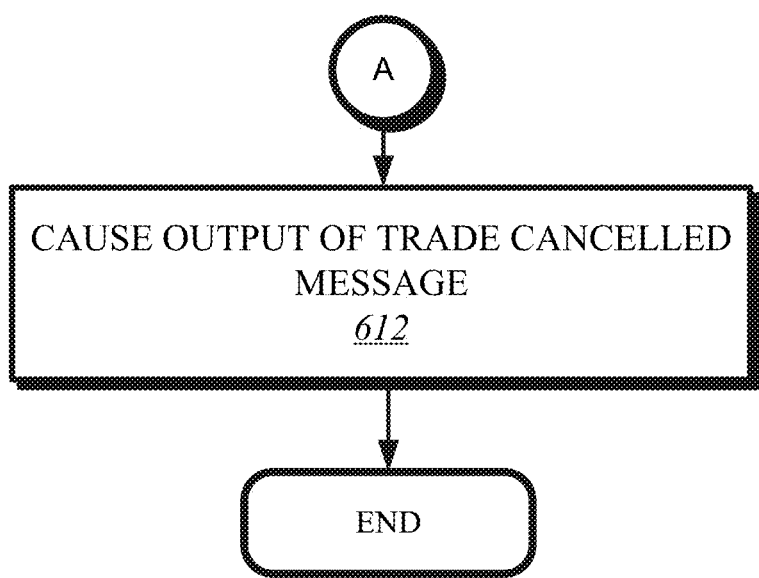
Figure 6C:
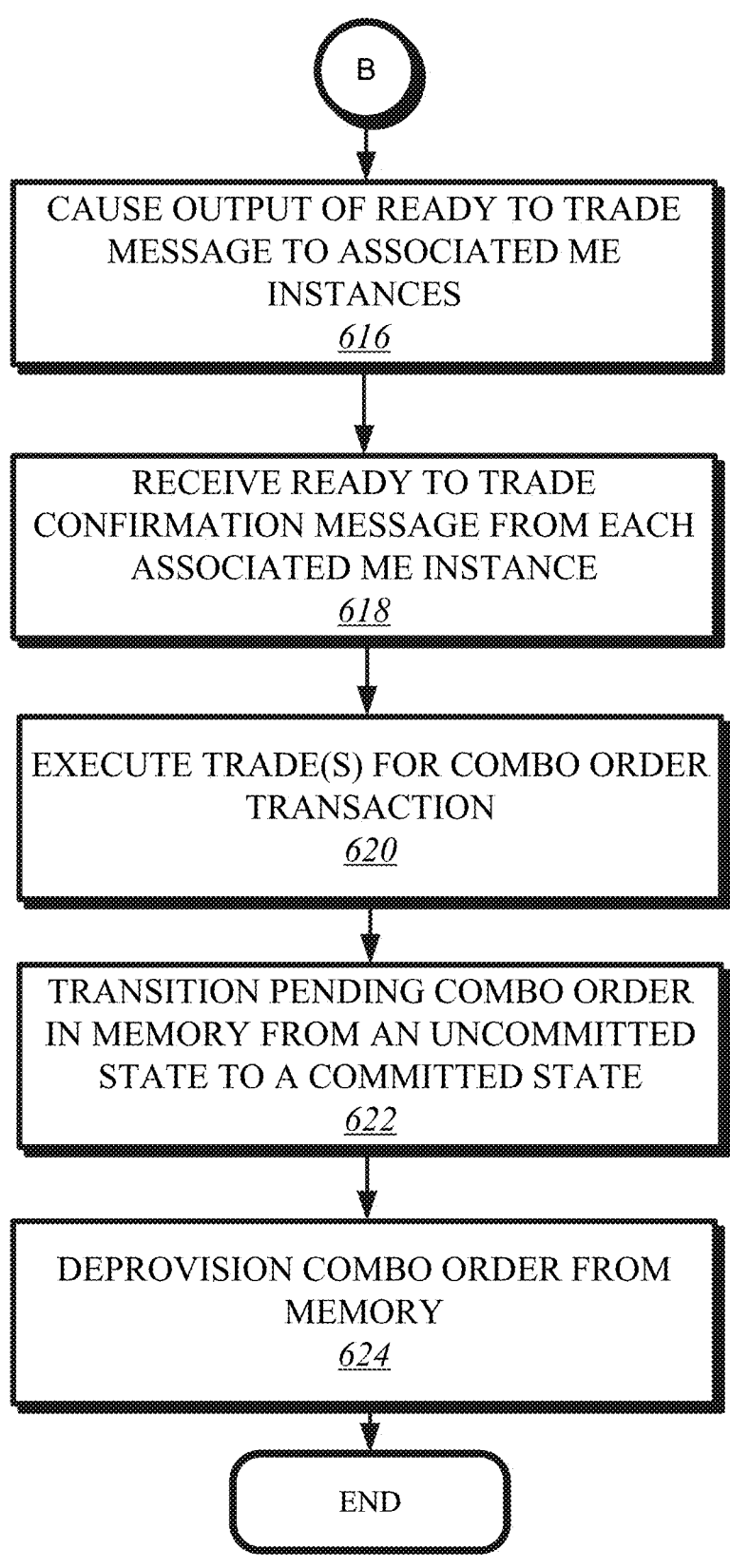

FIGS. 6A-6C collectively show an example process 600 for provisioning and execution of a combo order consistent with aspects of the present disclosure. The example process 600 can be executed by a controller of an ME instance consistent with the present disclosure. One such example controller suitable for use is controller 201 shown in FIG. 2. In act 602, the controller receives a first combo order provisioning message and provisions a combo order in memory. In act 604, the controller receives a request to execute a combo order transaction for a synthetic asset, e.g., via an executeOrder message. The combo order transaction can include a first leg associated with a first ME instance and a second leg associated with a second ME instance. The synthetic asset can represent a combination of a first asset type and a second asset type. The combo order transaction can further be associated with a third ME instance, with the third ME instance having an order book for the synthetic asset. In act 606, the controller locks a respective order book based on the received request to execute the combo order transaction. In act 608, the controller verifies that one or more trade(s) that satisfy a leg of the combo order transaction can be completed, e.g., based on current orders within the order book having a sufficient quantity and present value. In act 608, the controller can further identify at least one action to perform during the combo order transaction to cause execution of the trade(s) that satisfy a leg of the combo order transaction. In act 610, if the controller determines that the trade(s) associated with the received executed order are verified, the process 500 continues to act 614. Otherwise, the

TABLE 10

| Field | Value | Description |
| --- | --- | --- |
| messageType | Int (0x0a) | cancelTrade message type |
| comboOrderID | Integer | Identifier of provisioned combo order |
| originatorInstanceID | Integer | Identifier of originating ME instance for message |
| sequenceID | Integer | Uniquely identifies message sequence for given transaction associated with a combo order |
| timestamp | Timestamp | Timestamp for message |

The following methods and processes exemplify various aspects and features of the foregoing.

Figure 5:
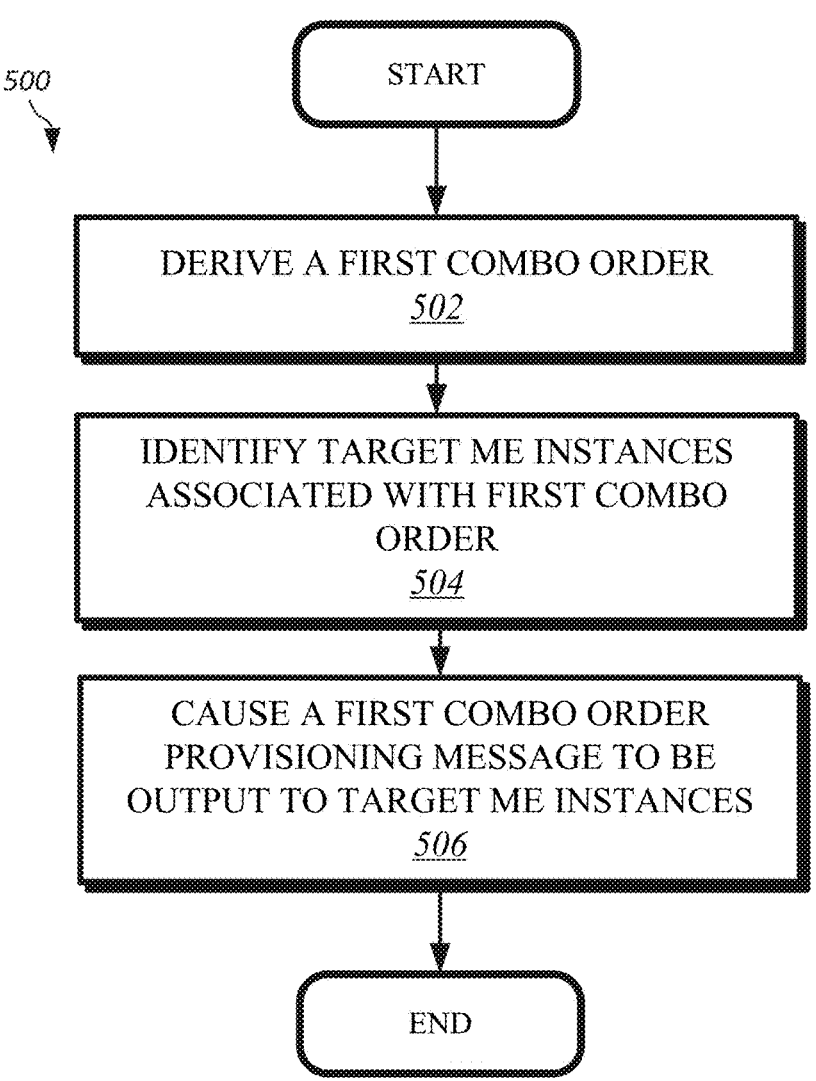
FIG. 5 shows an example process for deriving a combo order and causing provisioning of the same by associated ME instances.

In particular, FIG. 5 shows an example process 500 for initiating provisioning of a combo order consistent with aspects of the present disclosure. The example process 500 process 500 continues to act 612. In act 612, the controller causes output of a trade cancelled message (also referred to herein as a negative acknowledgement message) and the process 600 ends. In act 614, the controller stores a representation of pending combo order in a memory. In act 616, the controller causes output of a ready to trade message to associated ME instances. In act 618, the controller receives a ready trade conformation message from each associated ME instance (e.g., from at least two of the first ME instance, the second ME instance, and the third ME instance associated with the combo order transaction). In act 620, the controller executes the trades(s) for the combo order transaction based on completing/finalizing the at least one action identified in act 608. In act 622, the controller transitions the pending combo order in memory from an uncommitted state to a committed state. In act 624, the controller optionally deprovisions the combo order from memory. The process 600 then ends.

As previously discussed, one aim of the present disclosure is to allow for atomic transactions to occur across ME instances of an exchange system that avoids the introduction of processing latencies, e.g., due to locking of order books during a combo order transaction. In view of the foregoing, the combo order transaction protocol and processing features and aspects disclosed herein provides distributed, leader-less, synchronization of transaction states across the same that achieves atomic order processing for combo orders and performance latency characteristics which are analogous to that of non-distributed (e.g., single threaded) exchanges/ME instances. Moreover, the aforementioned direct inter-process communication between ME instances can further decrease message delivery times between ME instances of a combo order group. Thus, a distributed exchange system consistent with the present disclosure can scale to accommodate new asset types including new synthetic asset types and atomic transaction processing for the same while minimizing or otherwise reducing the introduction of order processing latencies in the exchange system.

Additional Examples and Permutations exemplifying the foregoing now follow.

Example 1 disclosed herein is a system comprising a memory including an order book, the order book being associated with a first asset type and configured to store one or more orders for the first asset type, a network interface circuit, and at least one processor configured to receive, via the network interface circuit, a first request to execute a combo order transaction for a synthetic asset, the combo order transaction including a first leg associated with a first matching engine instance and a second leg with a second matching engine instance, transition the order book to a locked state based on the received first request to execute the combo order transaction, identify at least one action to perform on the order book based on the received first request to execute the combo order transaction, receive, via the network interface circuit, a ready to trade message from the first matching engine instance and/or the second matching engine instance, and in response to receiving the ready to trade message, perform the at least one action on the order book and transition the order book to an unlocked state.

Example 2 includes the features of Example 1, wherein a maximum amount of time between transitioning the order book from the locked state to the unlocked state is in a range of 5 to 100 microseconds.

Example 3 includes the features of any one of Examples 1-2, wherein the received ready to trade message is configured to indicate that the first matching engine instance and/or the second matching engine instance is in a synchronized state, the synchronized state including an order book associated with the first matching engine instance and/or the second matching engine instance being in a locked state.

Example 4 includes the features of any one of Examples 1-3, wherein the at least one processor is configured to execute the first matching engine instance associated with the first leg of the combo order transaction, and wherein the combo order transaction is further associated with a third matching engine instance, the third matching engine instance having an order book to store orders for the synthetic asset, and wherein the at least one processor is further configured to receive, via the network interface circuit, the ready to trade message from the second matching engine instance and the third matching engine instance, and in response to receiving the ready to trade message from the second matching engine instance and third matching engine instance, perform the at least one action on the order book and transition the order book to an unlocked state.

Example 5 includes the features of any one of Examples 1-4, wherein the first request includes a combo order identifier that uniquely identifies the combo order transaction across a plurality of matching engine instances including the first and second matching engine instances.

Example 6 includes the features of Example 5, wherein the at least one processor is further configured to determine a first combo group identifier associated with the combo order identifier within the first request, and identify the first matching engine instance associated with the first leg and the second matching engine instance associated with the second leg based on the combo group identifier.

Example 7 includes the features of Example 6, wherein the at least one processor is configured to identify the first matching engine instance associated with the first leg and the second matching engine instance associated with the second leg based on a lookup stored in the memory that associates an identifier of the first matching engine instance and an identifier of the second matching engine instance with the first combo group identifier.

Example 8 includes the features of Example 7, wherein the lookup stored in the memory further associates the respective identifier of each the first and second matching engine instances with the first combo group identifier and with a respective role value.

Example 9 includes the features of Example 8, wherein the at least one processor is configured to execute the first matching engine instance based on a matching engine instance definition stored in the memory, the matching engine instance definition including an assigned identifier set equal to the identifier of the first matching engine instance, and wherein the at least one processor is configured to identify the at least one action to perform on the order book during the combo order transaction based on the respective role value associated with the identifier of the first matching engine instance.

Example 10 includes the features of any one of Examples 1-9, wherein the at least one processor is further configured to generate a provisional order in the memory based on the at least one identified action to perform on the order book, the provisional order being in an uncommitted state, receive, via the network interface circuit, the ready to trade message from the first matching engine instance and the second matching engine instance, and wherein the at least one processor is configured to perform the at least one action on the order book based on receiving the ready to trade message from the first matching engine instance and the second matching engine instance while the order book is in the locked state, the at least one action including transitioning the provisional order in the memory to a committed state.

Example 11 includes the features of any one of Examples 1-10, wherein the at least one processor is further configured to generate a provisional order in the memory based on the at least one identified action to perform on the order book, the provisional order being in an uncommitted state, and wherein the at least one processor is further configured to remove or invalidate the provisional order in the memory based on a predetermined amount of time elapsing after receiving the request to execute the combo order transaction.

Example 12 includes the features of Example 11, wherein the predetermined amount of time is in a range of 5 to 100 microseconds.

Example 13 includes the features of any one of Examples 1-13, wherein the at least one processor is further configured to receive a combo order group configuration file, the combo order group configuration file having a plurality of entries, each entry of the plurality of entries associating a combo order group identifier with an identifier of a matching engine instance associated with a first leg of a combo order transaction and an identifier of a matching engine instance associated with a second leg of the combo order transaction.

Example 14 includes the features of Example 13, wherein the at least one processor is further configured to execute a third matching engine instance, the third matching engine instance having a corresponding identifier that uniquely identifies the third matching engine instance across a plurality of matching engine instances that includes the first matching engine instance and the second matching engine instance, and wherein the at least one processor is further configured to receive a second request to execute a combo order transaction for a synthetic asset, the second request including an identifier; and cause the third matching engine instance to ignore the second request based on a lookup in the memory that indicates the identifier within the second request to execute the combo order transaction is associated with a group of matching engine instances that does not include the third matching engine instance.

Example 15 includes the features of any one of Examples 1-14, wherein the at least one processor is further configured to identify that the first asset type stored in the memory is associated with the first synthetic asset.

Example 16 includes the features of any one of Examples 1-15, wherein the at least one processor is configured to execute the first matching engine instance that is associated with the first leg of the combo order transaction, and wherein the at least one processor is configured to identify the at least one action to perform on the order book based on a role value in the memory, the role value indicating that the first matching engine instance is to buy or sell a predetermined amount of the first asset type via one or more orders within the order book.

Example 17 includes the features of any one of Examples 1-16, wherein the first request to execute the first combo order transaction includes a quantity value, and wherein the at least one processor is further configured to identify at least one order within the order book having a quantity equal to or greater than the quantity value of the combo order transaction, and send, via the network interface circuit, a ready to trade message to the first matching engine instance and the second matching engine instance.

Example 18 includes the features of any one of Examples 1-17, wherein the at least one processor is further configured to send a ready to trade message to the first matching engine instance and a third matching engine instance, the third matching engine instance having an order book for the first synthetic asset type.

Example 19 includes the features of claim 18, wherein the at least one processor is configured to send the ready to trade message as a multicast packet to an Internet Protocol (IP) multicast group, the IP multicast group being communicatively coupled to the first matching engine instance, the second matching engine instance, and the third matching engine instance.

Example 20 includes the features of any one of Examples 1-19, wherein the at least one processor is configured to transition the order book to the locked state based on identifying an order within the order book that satisfies a leg of the combo order transaction.

Example 21 includes the features of any one of Examples 1-20, wherein the at least one processor is further configured to output a trade complete message to the first matching engine instance and/or the second matching engine instance after performing the at least one action.

Example 22 includes the features of Example 21, wherein the trade complete message is output as a packet to an Internet Protocol (IP) multicast group and/or a User Datagram Protocol (UDP) broadcast address.

Example 23 includes the features of any one of Examples 1-22, wherein the request to execute the first combo order transaction is received by the at least one processor as a packet via a common communication channel, the common communication channel being communicatively coupled to the first matching engine instance, the second matching engine instance, and a third matching engine instance.

Example 24 includes the features of claim 23, wherein the common communication channel is an Internet Protocol (IP) multicast group and/or a User Datagram Protocol (UDP) broadcast address.

Example 25 includes the features of any one of Examples 1-24, wherein the request to execute the first combo order transaction is received by the at least one processor as a packet having an overall size in a range of 20 to 100 bytes.

Example 26 includes the features of any one of Examples 1-25, wherein the first synthetic asset represents a combination of the first asset type and the second asset type, wherein the first asset type is associated with an order book of the first matching engine instance and the second asset type is associated with an order book of the second matching engine instance.

Example 27 includes the features of Example 26, wherein the first and second asset types are a debt security, and wherein the first and second asset types have a different maturity period.

Example 28 includes the features of Example 26, wherein the first and second asset types are benchmark government bonds.

Example 29 includes the features of Example 27, wherein the request to execute the first combo order transaction for the first synthetic asset includes swapping, via the first and second legs, a target quantity of the first asset type for the second asset type or swapping a target quantity of the second asset type for the first asset type.

Example 30 includes a computer-implemented method comprising receiving, via a network interface circuit by at least one processor, a first request to execute a combo order transaction for a synthetic asset, the combo order transaction including a first leg associated with a first matching engine instance of a distributed exchange system and a second leg with a second matching engine instance of the distributed exchange system, transitioning, by the at least one processor, an order book in a memory to a locked state based on the received first request to execute the combo order transaction, identifying, by the at least one processor, at least one action to perform on the order book in the memory based on the received first request to execute the combo order transaction, receiving, by the at least one processor via the network interface circuit, a ready to trade message from the first matching engine instance and/or the second matching engine instance, and performing, by the at least one processor, the at least one action on the order book and transition the order book to an unlocked state based on receiving the ready to trade message.

Example 31 includes the features of Example 30, wherein a maximum amount of time between transitioning the order book from the locked state to the unlocked state is in a range of 5 to 100 microseconds.

Example 32 includes the features of any one of Examples 30-31, wherein the received ready to trade message is configured to indicate that the first matching engine instance and/or the second matching engine instance is in a synchronized state, the synchronized state including an order book associated with the first matching engine instance and/or the second matching engine instance being in a locked state.

Example 33 includes the features of any one of Examples 30-32, further comprising executing, by the at least one processor, the first matching engine instance associated with the first leg of the combo order transaction, and wherein the combo order transaction is further associated with a third matching engine instance, the third matching engine instance having an order book in the memory to store orders for a synthetic asset that represents a combination of a first and second asset type, and receiving, by the at least one processor via the network interface circuit, the ready to trade message from the second matching engine instance and the third matching engine instance, and in response to receiving the ready to trade message from the second matching engine instance and third matching engine instance, performing, by the at least one processor, the at least one action on the order book in the memory and transitioning the order book to an unlocked state.

Example 34 includes the features of any one of Examples 30-33, wherein the first request includes a combo order identifier that uniquely identifies the combo order transaction across a plurality of matching engine instances including the first and second matching engine instances.

Example 35 includes the features of Example 34, further comprising determining, by the at least one processor, a first combo group identifier associated with the combo order identifier within the first request, and identifying, by the at least one processor, the first matching engine instance associated with the first leg and the second matching engine instance associated with the second leg based on the combo group identifier.

Example 36 includes the features of any one of Examples 30-35, further comprising identifying, by the at least one processor, the first matching engine instance associated with the first leg and the second matching engine instance associated with the second leg based on a lookup stored in the memory that associates an identifier of the first matching engine instance and an identifier of the second matching engine instance with the first combo group identifier.

Example 37 includes the features of Example 36, wherein the lookup stored in the memory further associates the respective identifier of each the first and second matching engine instances with the first combo group identifier and with a respective role value.

Example 38 includes the features of Example 37, further comprising executing, by the at least one processor, the first matching engine instance based on a matching engine instance definition stored in the memory, the matching engine instance definition including an assigned identifier set equal to the identifier of the first matching engine instance, and identifying, by the at least one processor, the at least one action to perform on the order book during the combo order transaction based on the respective role value associated with the identifier of the first matching engine instance.

Example 39 includes the features of any one of Examples 30-38, further comprising generate, by the at least one processor, a provisional order in the memory based on the at least one identified action to perform on the order book, the provisional order being in an uncommitted state, receiving, by the at least one processor via the network interface circuit, the ready to trade message from the first matching engine instance and the second matching engine instance, and performing, by the at least one processor, the at least one action on the order book based on receiving the ready to trade message from the first matching engine instance and the second matching engine instance while the order book is in the locked state, the at least one action including transitioning the provisional order in the memory to a committed state.

Example 40 includes the features of any one of Examples 30-39, further comprising generating, by the at least one processor, a provisional order in the memory based on the at least one identified action to perform on the order book, the provisional order being in an uncommitted state, and removing or invalidating, by the at least one processor, the provisional order in the memory based on a predetermined amount of time elapsing after receiving the request to execute the combo order transaction.

Example 41 includes the features of Example 40, wherein the predetermined amount of time is in a range of 5 to 100 microseconds.

Example 42 includes the features of any one of Examples 30-41, wherein the at least one processor is further configured to receive a combo order group configuration file, the combo order group configuration file having a plurality of entries, each entry of the plurality of entries associating a combo order group identifier with an identifier of a matching engine instance associated with a first leg of a combo order transaction and an identifier of a matching engine instance associated with a second leg of the combo order transaction.

Example 43 includes the features of Example 42, further comprising executing, by the at least one processor, a third matching engine instance, the third matching engine instance having a corresponding identifier that uniquely identifies the third matching engine instance across a plurality of matching engine instances that includes the first matching engine instance and the second matching engine instance, receiving, by the at least one processor, a second request to execute a combo order transaction for a synthetic asset, the second request including an identifier, and causing, by the at least one processor, the third matching engine instance to ignore the second request based on a lookup in the memory that indicates the identifier within the second request to execute the combo order transaction is associated with a group of matching engine instances that does not include the third matching engine instance.

Example 44 includes the features of any one of Examples 30-43, further comprising identifying, by the at least one processor, that a first asset type stored in the memory is associated with the first synthetic asset.

Example 45 includes the features of Example 44, further comprising executing, by the at least one processor, the first matching engine instance that is associated with the first leg of the combo order transaction, and identifying, by the at least one processor, the at least one action to perform on the order book based on a role value in the memory, the role value indicating that the first matching engine instance is to buy or sell a predetermined amount of the first asset type via one or more orders within the order book.

Example 46 includes the features of any one of Examples 44-45, wherein the first request to execute the first combo order transaction includes a quantity value, and wherein the computer-implemented method further comprises identifying, by the at least one processor, at least one order within the order book having a quantity equal to or greater than the quantity value of the combo order transaction and sending, by the at least one processor via the network interface circuit, a ready to trade message to the first matching engine instance and the second matching engine instance.

Example 47 includes the features of any one of Examples 44-46, further comprising sending, by the at least one processor, a ready to trade message to the first matching engine instance and a third matching engine instance, the third matching engine instance having an order book for the first synthetic asset type.

Example 48 includes the features of Example 47, further comprising sending, by the at least one processor, the ready to trade message as a multicast packet to an Internet Protocol (IP) multicast group, the IP multicast group being communicatively coupled to the first matching engine instance, the second matching engine instance, and the third matching engine instance.

Example 49 includes the features of any one of Examples 30-48, wherein the at least one processor is configured to transition the order book to the locked state based on identifying an order within the order book that satisfies a leg of the combo order transaction.

Example 50 includes the features of any one of Examples 30-49, further comprising outputting, by the at least one processor, a trade complete message to the first matching engine instance and/or the second matching engine instance after performing the at least one action.

Example 51 includes the features of Example 50, wherein the trade complete message is output as a packet to an Internet Protocol (IP) multicast group and/or a User Datagram Protocol (UDP) broadcast address.

Example 52 includes the features of any one of Examples 30-51, wherein the request to execute the first combo order transaction is received by the at least one processor as a packet via a common communication channel, the common communication channel being communicatively coupled to the first matching engine instance, the second matching engine instance, and a third matching engine instance.

Example 53 includes the features of Example 52, wherein the common communication channel is an Internet Protocol (IP) multicast group and/or a User Datagram Protocol (UDP) broadcast address.

Example 54 includes the features of any one of Examples 30-53, wherein the request to execute the first combo order transaction is received by the at least one processor as a packet having an overall size in a range of 20 to 100 bytes.

Example 55 includes the features of any one of Examples 30-54, wherein the first synthetic asset represents a combination of a first asset type and a second asset type, wherein the first asset type is associated with an order book in a memory of the first matching engine instance and the second asset type is associated with an order book in a memory of the second matching engine instance.

Example 56 includes the features of Example 55, wherein the first and second asset types are a debt security, and wherein the first and second asset types have a different maturity period.

Example 57 includes the features of Example 56, wherein the first and second asset types are benchmark government bonds.

Example 58 includes the features of Example 58, wherein the request to execute the first combo order transaction for the first synthetic asset is configured to cause swapping, via respective matching engine instances of the first and second legs, a target quantity of the first asset type for the second asset type or swapping a target quantity of the second asset type for the first asset type.

Example 59 is a computer-readable medium (or computer-program product) having a plurality non-transitory instructions stored thereon that when executed by at least one processor cause the at least one processor to carry out a method in accordance with the acts/features of any one of Examples 30-59.

Example 60 is a system comprising a memory to store a plurality of matching engine instance identifiers including a first matching engine instance identifier and a second matching engine instance identifier, the first matching engine instance identifier corresponding to a first matching engine instance that processes orders for a first asset type and the second matching engine instance identifier corresponding to a second matching engine instance that processes order for a second asset type, at least one processor to derive a first combo order based on the first asset type and the second asset type, the first combo order having a first leg associated with the first matching engine instance and a second leg associated with the second matching engine instance, output a first combo order provisioning message to the first matching engine instance and the second matching engine instance, the first combo order provisioning message including an identifier of the first combo order and configured to cause each of the first and second matching engine instances to store a representation of the first combo order in a memory.

Example 61 includes the features of Example 60, wherein the at least one processor is configured to derive the first combo order based on a difference between the first asset type and the second asset type.

Example 62 includes the features of any one of Examples 60-61, wherein the first asset type is a debt security with a first yield value and a first maturity period, and the second asset type is a debt security with a second yield value and a second maturity period.

Example 63 includes the features of Example 62, wherein the first maturity period of the first asset type is different than the second maturity period of the second asset type, and wherein the first maturity period of the first asset type is at least two years.

Example 64 includes the features of any one of Examples 60-63, wherein the first asset type corresponds with a first benchmark government bond and the second asset type corresponds with a second benchmark government bond, the first and second benchmark government bonds having different maturity periods.

Example 65 includes the features of any one of Examples 60-64, further comprising a matching engine instance lookup stored in the memory, the matching engine instance lookup having a first entry that associates the identifier of the first matching engine instance with an identifier of the first asset type and a second entry that associates the identifier of the second matching engine instance with an identifier of the second asset type.

Example 66 includes the features of Example 65, wherein each of the first and second entries further include a present value (PV) and a yield value stored in the memory.

Example 67 includes the features of Example 66, wherein the at least one processor is further configured to determine a difference between the yield value associated with the first matching engine instance and the yield value associated with the second matching engine instance, and wherein the at least one processor derives the first combo order based on the determined difference.

Example 68 includes the features of Example 67, wherein the first combo order provisioning message includes the identifier of the first matching engine instance and the identifier of the second matching engine instance of the plurality of matching engine instance identifiers.

Example 69 includes the features of Example 67, wherein the memory includes a combo order configuration lookup, the combo order configuration lookup including at least a first entry that associates the first asset type and the second asset type with a third asset type, the third asset type being a synthetic asset that represents a combination of the first asset type and the second asset type.

Example 70 includes the features of Example 69, wherein the first combo order provisioning message includes an identifier of the synthetic asset.

Example 71 includes the features of Example 70, wherein the identifier of the synthetic asset is a value encoded within a predetermined number of bits.

Example 72 includes the features of Example 71, wherein the predetermined number of bits is in a range of 4 to 16 bits.

Example 73 includes the features of any one of Examples 60-72, wherein the at least one processor is further configured to output a combo order configuration message to the first and second matching engine instances, the combo order configuration message including an identifier of a group of matching engine instances for the derived combo order and/or an identifier of the first and second matching engine instances.

Example 74 includes the features of any one of Examples 73, wherein the combo order configuration message is output to the first and second matching engine instances in a predetermined format.

Example 75 includes the features of Example 74, wherein the predetermined format is JavaScript Object Notation (JSON).

Example 75 includes the features of any one of Examples 72-75, wherein the combo order configuration message is configured to cause the first and second matching engine instances to store in a memory the identifier of the group of matching engine instances within a lookup table.

Example 76 includes the features of any one of Examples 72-75, wherein the combo order configuration message is configured to cause the first and second matching engine instances to store an entry in a lookup table within memory, the entry including the identifier of the group of matching engine instances and at least one identifier corresponding to the first asset type, the second asset type, the first matching engine instance, and/or the second matching engine instance.

Example 77 includes the features of any one of Examples 60-76, wherein the first combo order provisioning message further includes a first value that represents a last known state of the first matching engine instance and a second value that represents a last known state of the second matching engine instance.

Example 78 includes the features of any one of Examples 60-77, wherein the identifier of the derived first combo order is a value encoded within an array of bytes, the array of bytes having a predetermined length.

Example 79 includes the features of Example 78, wherein the predetermined length is in a range of one to eight bytes.

Example 80 includes the features of any one of Examples 60-79, wherein the at least one processor is further configured to output the first combo order provisioning message to a third matching engine instance, the third matching engine instance being different than the first and second matching engine instance and configured to process orders for a third asset type, the third asset type being different than the first and second asset types, and wherein the first combo order provisioning message is configured to be ignored by the third matching engine instance based on a value of at least one bit within the first combo order provisioning message.

Example 81 includes the features of any one of Examples 60-80, further comprising a network interface circuit, and wherein the at least one processor is configured to cause the first combo order provisioning message to be output as a packet to the first matching engine instance and the second matching engine instance via the network interface circuit.

Example 82 includes the features of Example 81, wherein the packet is implemented as a Transmission Control Protocol (TCP) packet.

Example 83 includes the features of Example 81, wherein the packet is implemented as a User Datagram Protocol (UDP) packet.

Example 84 includes the features of any one of Examples 60-83, wherein the at least one processor is configured to cause the first combo order provisioning message to be output to the first and second matching engine instances as a packet via a common data channel.

Example 85 includes the features of Example 84, wherein the common data channel is an Internet Protocol (IP) multicast group, and wherein the packet is an Internet Protocol (IP) multicast packet.

Example 86 includes the features of any one of Examples 60-85, wherein the first combo order provisioning message includes an identifier of the first matching engine instance associated with a first leg of the first combo order and an identifier of the second matching engine instance associated with a second leg of the first combo order, or the first combo order provisioning message includes an identifier that is associated with a combo order group that includes the first and second matching engine instances.

Example 87 includes the features of Example 86, wherein the first combo order provisioning message further includes a present value (PV) and/or a yield value associated with each of the first and second matching engine instances.

Example 88 includes the features of Example 87, wherein the first leg of the first combo order includes one or more trades to sell a quantity of a first asset type associated with the first matching engine instance, and wherein the second leg of the first combo order includes one or more trades to buy a quantity of a second asset type associated with the second matching engine instance.

Example 89 includes the features of any one of Examples 87-88, wherein the at least one processor is configured to receive a first update message from the first matching engine instance, the first update message including a current PV for the first asset type of the first matching engine instance, and wherein the PV value of the first combo order provisioning message associated with the first matching engine instance is based on the current PV within the received first update message.

Example 90 includes the features of any one of Examples 87-89, wherein the at least one processor is configured to receive a second update message from the second matching engine instance, the second update message including a current PV for the second asset type of the second matching engine instance, and wherein the PV value of the first combo order provisioning message associated with the second matching engine instance is based on the current PV within the received second update message.

Example 91 includes the features of Example 90, wherein the at least one processor is configured to receive the first update message from the first matching engine instance via a data network.

Example 92 includes the features of any one of Examples 89-91, wherein the at least one processor is configured to receive the first update message from the first matching engine instance via an Internet Protocol (IP) multicast group.

Example 93 includes the features of any one of examples 90-92, wherein the at least one processor is configured to receive the first update message from the first matching engine instance and the second update message from the second matching engine instance via a predetermined Internet Protocol (IP) multicast group or via one or more User Datagram Protocol (UDP) broadcast messages.

Example 94 includes the features of Example 93, wherein the first combo order provisioning message is output to the first matching engine instance and the second matching engine instance via the predetermined IP multicast group.

Example 95 includes the features of Example 94, wherein the first combo order provisioning message is output to the first matching engine instance and the second matching engine instance via the predetermined IP multicast group, and the at least one processor is configured to receive the first update message from the first matching engine instance and the second update message from the second matching engine instance via the predetermined Internet Protocol (IP) multicast group.

Example 96 includes the features of any one of Examples 60-95, wherein the at least one processor is further configured to cause the first combo order provisioning message to be output to a third matching engine instance, and wherein the first combo order provisioning message is configured to cause the third matching engine instance to store a representation of the first derived combo order as a resting order.

Example 97 includes the features of Example 96, wherein the at least one processor is configured to receive an order submitted acknowledgement message from at least the third matching engine instance in response to output of the first combo order provisioning message.

Example 98 includes the features of any one of Examples 60-97, wherein the at least one processor is configured to receive at least two order received acknowledgement messages in response to the first combo order provisioning message being output to the first and second matching engine instances.

Example 100 is a computer-implemented method comprising storing, by at least one processor, a plurality of matching engine instance identifiers including a first matching engine instance identifier and a second matching engine instance identifier in a memory, the first matching engine instance identifier corresponding to a first matching engine instance that processes orders for a first asset type and the second matching engine instance identifier corresponding to a second matching engine instance that processes order for a second asset type, deriving, by the at least one processor, a first combo order based on the first asset type and the second asset type, the first combo order having a first leg associated with the first matching engine instance and a second leg associated with the second matching engine instance, outputting, by the at least one processor, a first combo order provisioning message to the first matching engine instance and the second matching engine instance, the first combo order provisioning message including an identifier of the first combo order and configured to cause each of the first and second matching engine instances to store a representation of the first combo order in a memory.

Example 101 includes the features of Example 100, further comprising deriving, by the at least one processor, the first combo order based on a difference between the first asset type and the second asset type.

Example 102 includes the features of Example 101, wherein the first asset type is a debt security with a first yield value and a first maturity period, and the second asset type is a debt security with a second yield value and a second maturity period.

Example 103 includes the features of Example 102, wherein the first maturity period of the first asset type is different than the second maturity period of the second asset type, and wherein the first maturity period of the first asset type is at least two years.

Example 104 includes the features of any one of Examples 100-103, wherein the first asset type corresponds with a first benchmark government bond and the second asset type corresponds with a second benchmark government bond, the first and second benchmark government bonds having different maturity periods.

Example 105 includes the features of any one of Examples 100-104, further comprising storing, by the at least one processor, a matching engine instance lookup stored in the memory, the matching engine instance lookup having a first entry that associates the identifier of the first matching engine instance with an identifier of the first asset type and a second entry that associates the identifier of the second matching engine instance with an identifier of the second asset type.

Example 106 includes the features of Example 105, wherein each of the first and second entries further include a present value (PV) and a yield value stored in the memory.

Example 107 includes the features of Example 106, further comprising determining, by the at least one processor, a difference between the yield value associated with the first matching engine instance and the yield value associated with the second matching engine instance, and wherein deriving the first combo order by the at least one processor is based on the determined difference.

Example 108 includes the features of Example 107, wherein the first combo order provisioning message includes the identifier of the first matching engine instance and the identifier of the second matching engine instance of the plurality of matching engine instance identifiers.

Example 109 includes the features of any one of Examples 107-108, further comprising storing, by the at least one processor, a combo order configuration lookup in the memory, the combo order configuration lookup including at least a first entry that associates the first asset type and the second asset type with a third asset type, the third asset type being a synthetic asset that represents a combination of the first asset type and the second asset type.

Example 110 includes the features of Example 109, wherein the first combo order provisioning message includes an identifier of the synthetic asset.

Example 111 includes the features of Example 110, wherein the identifier of the synthetic asset is a value encoded within a predetermined number of bits.

Example 112 includes the features Example 111, wherein the predetermined number of bits is in a range of 4 to 16 bits.

Example 113 includes the features of any one of Examples 100-112, further comprising outputting, by the at least one processor, a combo order configuration message to the first and second matching engine instances, the combo order configuration message including an identifier of a group of matching engine instances for the derived combo order and/or an identifier of the first and second matching engine instances.

Example 114 includes the features of Example 113, wherein outputting the combo order configuration message further includes outputting the combo order configuration message to the first and second matching engine instances in a predetermined format.

Example 115 includes the features of Example 114, wherein the predetermined format is JavaScript Object Notation (JSON).

Example 116 includes the features of any one of Examples 113-115, wherein outputting the combo order configuration message to the first and second matching engine instances causes the first and second matching engine instances to store in a memory the identifier of the group of matching engine instances within a lookup table.

Example 117 includes the features of any one of Examples 113-116, wherein outputting the combo order configuration message to the first and second matching engine instances causes the first and second matching engine instances to store an entry in a lookup table within memory, the entry including the identifier of the group of matching engine instances and at least one identifier corresponding to the first asset type, the second asset type, the first matching engine instance, and/or the second matching engine instance.

Example 118 includes the features of any one of Examples 100-117, wherein outputting the first combo order provisioning message further includes outputting the first order provisioning message with a first value that represents a last known state of the first matching engine instance and a second value that represents a last known state of the second matching engine instance.

Example 119 includes the features of any one of Examples 100-118, wherein the identifier of the derived first combo order is a value encoded within an array of bytes, the array of bytes having a predetermined length.

Example 120 includes the features of Example 119, wherein the predetermined length is in a range of one to eight bytes.

Example 121 includes the features of any one of Examples 100-120, further comprising outputting, by the at least one processor, the first combo order provisioning message to a third matching engine instance, the third matching engine instance being different than the first and second matching engine instance and configured to process orders for a third asset type, the third asset type being different than the first and second asset types, and wherein the first combo order provisioning message is configured to be ignored by the third matching engine instance based on a value of at least one bit within the combo order provisioning message.

Example 122 includes the features of any one of Examples 100-121, further comprising causing, by the at least one processor via a network interface circuit, the first combo order provisioning message to be output as a packet to the first matching engine instance and the second matching engine instance via the network interface circuit.

Example 123 includes the features of Example 122, wherein the packet is implemented as a Transmission Control Protocol (TCP) packet.

Example 124 includes the features of Example 123, wherein the packet is implemented as a User Datagram Protocol (UDP) packet.

Example 125 includes the features of any one of Examples 100-124, further comprising causing, by the at least one processor, the first combo order provisioning message to be output to the first and second matching engine instances as a packet via a common data channel.

Example 126 includes the features of Example 125, wherein the common data channel is an Internet Protocol (IP) multicast group, and wherein the packet is an Internet Protocol (IP) multicast packet.

Example 127 includes the features of any one of Examples 100-126, wherein the first combo order provisioning message includes an identifier of the first matching engine instance associated with a first leg of the first combo order and an identifier of the second matching engine instance associated with a second leg of the first combo order, or the first combo order provisioning message includes an identifier that is associated with a combo order group that includes the first and second matching engine instances.

Example 128 includes the features of Example 127, wherein the first combo order provisioning message further includes a present value (PV) and/or a yield value associated with each of the first and second matching engine instances.

Example 129 includes the features of Example 128, wherein the first leg of the first combo order includes one or more trades to sell a quantity of a first asset type associated with the first matching engine instance, and wherein the second leg of the first combo order includes one or more trades to buy a quantity of a second asset type associated with the second matching engine instance.

Example 130 includes the features of any one of Examples 128-129, further comprising receiving, by the at least one processor, a first update message from the first matching engine instance, the first update message including a current PV for the first asset type of the first matching engine instance, and wherein the PV value of the first combo order provisioning message associated with the first matching engine instance is based on the current PV within the received first update message.

Example 131 includes the features of any one of Examples 128-130, further comprising receiving, by the at least one processor, a second update message from the second matching engine instance, the second update message including a current PV for the second asset type of the second matching engine instance, and wherein the PV value of the first combo order provisioning message associated with the second matching engine instance is based on the current PV within the received second update message.

Example 132 includes the features of Example 131, further comprising receiving, by the at least one processor, the first update message from the first matching engine instance via a data network.

Example 133 includes the features of any one of Examples 131-132, wherein receiving the first update message from the first matching engine instance further includes receiving the first update message via an Internet Protocol (IP) multicast group.

Example 134 includes the features of any one of Examples 131-133, wherein receiving the first update message from the first matching engine instance and the second update message from the second matching engine instance includes receiving the first update message via a predetermined Internet Protocol (IP) multicast group or via one or more User Datagram Protocol (UDP) broadcast messages.

Example 135 includes the features of Example 134, wherein outputting the first combo order provisioning message further includes outputting the first combo order provisioning message to the first matching engine instance and the second matching engine instance via the predetermined IP multicast group.

Example 138 includes the features of Example 135, wherein outputting the first combo order provisioning message further includes outputting the first combo order provisioning message to the first matching engine instance and the second matching engine instance via the predetermined IP multicast group, and wherein the computer-implemented method further comprises receiving, by the at least one processor, the first update message from the first matching engine instance and the second update message from the second matching engine instance via the predetermined Internet Protocol (IP) multicast group.

Example 139 includes the features of any one of Examples 100-138, further comprising causing, by the at least one processor, the first combo order provisioning message to be output to a third matching engine instance, and wherein the first combo order provisioning message is configured to cause the third matching engine instance to store a representation of the first derived combo order as a resting order.

Example 140 includes the features of Example 139, further comprising receiving, by the at least one processor, an order submitted acknowledgement message from at least the third matching engine instance in response to output of the first combo order provisioning message.

Example 141 includes the features of any one of Examples 100-140, further comprising receiving at least two order received acknowledgement messages in response to the first combo order provisioning message being output to the first and second matching engine instances.

Example 142 is a computer-readable medium (or computer-program product) having a plurality of non-transitory instructions stored thereon that when executed by at least one processor cause the at least one processor to perform a method in accordance with the acts/features of any one of the Examples 100-141.

Example 143 is a computer system having a network interface, at least one processor, and instructions stored in a memory that when executed by the at least one processor cause a first matching engine instance to be executed, the first matching engine instance to receive, via the network interface, a first request to execute a first combo order transaction for a synthetic asset, determine one or more orders stored within an order book satisfy a first leg of the first combo order transaction, transition the order book to a locked state and generate a first provisional change to the order book in memory based on determining the one more orders stored within the order book satisfy the first leg of the first combo order transaction, send, via the network interface, a first ready to trade message to a second matching engine instance associated with a second leg of the first combo order transaction, the first ready to trade message to indicate to the second matching engine that the order book was transitioned to the locked state and that the first provisional change to the order book was generated, receive, via the network interface, a ready to trade message from the second matching engine instance associated with the second leg of the combo order transaction, and in response to receiving the ready to trade message, commit the provisional change to the order book and transition the order book from the locked state to an unlocked state.

Example 144 includes the features of Example 143, wherein the first matching engine instance is further to send, via the network interface, the first ready to trade message to the second matching engine instance and a third matching engine instance via a single packet output to an Internet Protocol (IP) multicast group or a User Datagram Protocol (UDP) multicast address, wherein the first ready to trade message is configured to cause each of the second and third matching engine instances to commit a provisional change in memory to a respective order book and transition the respective order book from a locked state to an unlock state.

Example 145 is a computer-implemented method comprising receiving, via a network interface by at least one processor, a first request to execute a first combo order transaction for a synthetic asset, determining, by the at least one processor, one or more orders stored within an order book in memory that satisfy a first leg of the first combo order transaction, transitioning, by the at least one processor, the order book to a locked state and generate a first provisional change to the order book in memory based on determining the one more orders stored within the order book satisfy the first leg of the first combo order transaction, sending, via a network interface by the at least one processor, a first ready to trade message to a second matching engine instance associated with a second leg of the first combo order transaction, the first ready to trade message to indicate to the second matching engine that the order book was transitioned to the locked state and that the first provisional change to the order book was generated, receiving, via the network interface by the at least one processor, a ready to trade message from the second matching engine instance associated with the second leg of the combo order transaction, and in response to receiving the ready to trade message, committing, by the at least one processor, the provisional change to the order book and transitioning the order book from the locked state to an unlocked state.

Example 146 includes the features of Example 145, further comprising sending, via the network interface by the at least one processor, the first ready to trade message to the second matching engine instance and a third matching engine instance via a single packet output to an Internet Protocol (IP) multicast group or a User Datagram Protocol (UDP) multicast address, wherein the first ready to trade message is configured to cause each of the second and third matching engine instances to commit a provisional change in memory to a respective order book and transition the respective order book from a locked state to an unlock state.

Example 147 is a computer-readable medium (or computer program product) having a plurality of non-transitory instructions stored thereon that when executed by at least one processor cause the at least one processor to perform a method in accordance with the acts/features of any one of Examples 145-146.

Aspects of the methods described herein may be implemented using a processor and/or other programmable device. To that end, the methods described herein may be implemented on a tangible, computer readable storage medium having instructions stored thereon that when executed by one or more processors perform the methods. Thus, for example, an exchange system consistent with present disclosure may include a storage medium (not shown) to store instructions (in, for example, firmware or software) to perform the operations described herein. The storage medium may include any type of non-transitory tangible medium, for example, any type of disk including floppy disks, optical disks, compact disk read-only memories (CD-ROMs), compact disk re-writables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

In some aspects, the techniques described herein relate to a system including: a memory including an order book, the order book being associated with a first asset type and configured to store one or more orders for the first asset type; a network interface circuit; and at least one processor configured to: receive, via the network interface circuit, a first request to execute a combo order transaction for a synthetic asset, the combo order transaction including a first leg associated with a first matching engine instance and a second leg with a second matching engine instance; transition the order book to a locked state based on the received first request to execute the combo order transaction; identify at least one action to perform on the order book based on the received first request to execute the combo order transaction; receive, via the network interface circuit, a ready to trade message from the first matching engine instance and/or the second matching engine instance; and in response to receiving the ready to trade message, perform the at least one action on the order book and transition the order book to an unlocked state.

In some aspects, the techniques described herein relate to a computer-implemented method including: receiving, via a network interface circuit by at least one processor, a first request to execute a combo order transaction for a synthetic asset, the combo order transaction including a first leg associated with a first matching engine instance of a distributed exchange system and a second leg with a second matching engine instance of the distributed exchange system; transitioning, by the at least one processor, an order book in a memory to a locked state based on the received first request to execute the combo order transaction; identifying, by the at least one processor, at least one action to perform on the order book in the memory based on the received first request to execute the combo order transaction; receiving, by the at least one processor via the network interface circuit, a ready to trade message from the first matching engine instance and/or the second matching engine instance; and performing, by the at least one processor, the at least one action on the order book and transition the order book to an unlocked state based on receiving the ready to trade message.

In some aspects, the techniques described herein relate to a computer-readable medium having a plurality non-transitory instructions stored thereon that when executed by at least one processor cause the at least one processor to: receive, via a network interface circuit, a first request to execute a combo order transaction for a synthetic asset, the combo order transaction including a first leg associated with a first matching engine instance of a distributed exchange system and a second leg with a second matching engine instance of the distributed exchange system; transition an order book in a memory to a locked state based on the received first request to execute the combo order transaction; identify at least one action to perform on the order book in the memory based on the received first request to execute the combo order transaction; receive, via the network interface circuit, a ready to trade message from the first matching engine instance and/or the second matching engine instance; and perform, the at least one action on the order book and transition the order book to an unlocked state based on receiving the ready to trade message.

In some aspects, the techniques described herein relate to a system including: a memory to store a plurality of matching engine instance identifiers including a first matching engine instance identifier and a second matching engine instance identifier, the first matching engine instance identifier corresponding to a first matching engine instance that processes orders for a first asset type and the second matching engine instance identifier corresponding to a second matching engine instance that processes order for a second asset type; at least one processor to: derive a first combo order based on the first asset type and the second asset type, the first combo order having a first leg associated with the first matching engine instance and a second leg associated with the second matching engine instance; output a first combo order provisioning message to the first matching engine instance and the second matching engine instance, the first combo order provisioning message including an identifier of the first combo order and configured to cause each of the first and second matching engine instances to store a representation of the first combo order in a memory.

In some aspects, the techniques described herein relate to a computer-implemented method including: storing, by at least one processor, a plurality of matching engine instance identifiers including a first matching engine instance identifier and a second matching engine instance identifier in a memory, the first matching engine instance identifier corresponding to a first matching engine instance that processes orders for a first asset type and the second matching engine instance identifier corresponding to a second matching engine instance that processes order for a second asset type; deriving, by the at least one processor, a first combo order based on the first asset type and the second asset type, the first combo order having a first leg associated with the first matching engine instance and a second leg associated with the second matching engine instance; outputting, by the at least one processor, a first combo order provisioning message to the first matching engine instance and the second matching engine instance, the first combo order provisioning message including an identifier of the first combo order and configured to cause each of the first and second matching engine instances to store a representation of the first combo order in a memory.

In some aspects, the techniques described herein relate to a computer-readable medium having a plurality of non-transitory instructions stored thereon that when executed by at least one processor cause the at least one processor to: Store a plurality of matching engine instance identifiers including a first matching engine instance identifier and a second matching engine instance identifier in a memory, the first matching engine instance identifier corresponding to a first matching engine instance that processes orders for a first asset type and the second matching engine instance identifier corresponding to a second matching engine instance that processes order for a second asset type; derive a first combo order based on the first asset type and the second asset type, the first combo order having a first leg associated with the first matching engine instance and a second leg associated with the second matching engine instance; output a first combo order provisioning message to the first matching engine instance and the second matching engine instance, the first combo order provisioning message including an identifier of the first combo order and configured to cause each of the first and second matching engine instances to store a representation of the first combo order in a memory.

In some aspects, the techniques described herein relate to a computer system having a network interface, at least one processor, and instructions stored in a memory that when executed by the at least one processor cause a first matching engine instance to be executed, the first matching engine instance to: receive, via the network interface, a first request to execute a first combo order transaction for a synthetic asset; determine one or more orders stored within an order book satisfy a first leg of the first combo order transaction; transition the order book to a locked state and generate a first provisional change to the order book in memory based on determining the one more orders stored within the order book satisfy the first leg of the first combo order transaction; send, via the network interface, a first ready to trade message to a second matching engine instance associated with a second leg of the first combo order transaction, the first ready to trade message to indicate to the second matching engine that the order book was transitioned to the locked state and that the first provisional change to the order book was generated; receive, via the network interface, a ready to trade message from the second matching engine instance associated with the second leg of the combo order transaction; and in response to receiving the ready to trade message, commit the provisional change to the order book and transition the order book from the locked state to an unlocked state.

In some aspects, the techniques described herein relate to a computer-implemented method including: receiving, via a network interface by at least one processor, a first request to execute a first combo order transaction for a synthetic asset; determining, by the at least one processor, one or more orders stored within an order book in memory that satisfy a first leg of the first combo order transaction; transitioning, by the at least one processor, the order book to a locked state and generate a first provisional change to the order book in memory based on determining the one more orders stored within the order book satisfy the first leg of the first combo order transaction; sending, via a network interface by the at least one processor, a first ready to trade message to a second matching engine instance associated with a second leg of the first combo order transaction, the first ready to trade message to indicate to the second matching engine that the order book was transitioned to the locked state and that the first provisional change to the order book was generated; receiving, via the network interface by the at least one processor, a ready to trade message from the second matching engine instance associated with the second leg of the combo order transaction; and in response to receiving the ready to trade message, committing, by the at least one processor, the provisional change to the order book and transitioning the order book from the locked state to an unlocked state.

In some aspects, the techniques described herein relate to a computer-readable medium having a plurality of non-transitory instructions stored thereon that when executed by at least one processor cause the at least one processor to: receive a first request to execute a first combo order transaction for a synthetic asset; determine one or more orders stored within an order book in memory that satisfy a first leg of the first combo order transaction; transition the order book to a locked state and generate a first provisional change to the order book in memory based on determining the one more orders stored within the order book satisfy the first leg of the first combo order transaction; send a first ready to trade message to a second matching engine instance associated with a second leg of the first combo order transaction, the first ready to trade message to indicate to the second matching engine that the order book was transitioned to the locked state and that the first provisional change to the order book was generated; receive a ready to trade message from the second matching engine instance associated with the second leg of the combo order transaction; and in response to receiving the ready to trade message, commit the provisional change to the order book and transition the order book from the locked state to an unlocked state.

Block diagrams provided herein represent conceptual views of illustrative circuitry embodying the principles of the disclosure. Any flow charts, flow diagrams, state transition diagrams, pseudocode, and the like of the present disclosure represent various processes which may be substantially represented in computer readable medium and so executed by a computer or processor, whether or not such computer or processor is explicitly shown.

The functions of the various elements shown in the figures, including any functional blocks, may be provided through the use of dedicated hardware as well as hardware capable of executing software in association with appropriate software. When provided by a processor/controller, the functions may be provided by a single dedicated processor, by a single shared processor, or by a plurality of individual processors, some of which may be shared. Moreover, explicit use of the term "processor" or "controller" do not necessarily refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage.

As used in any embodiment herein, "circuit" or "circuitry" may comprise, for example, singly or in any combination, hardwired circuitry, programmable circuitry, state machine circuitry, and/or firmware that stores instructions executed by programmable circuitry. In at least one example, any component of an exchange system consistent with the present disclosure, e.g., an ME instance such as shown in FIG. 2, may comprise one or more integrated circuits. An "integrated circuit" may be a digital, analog, or mixed-signal semiconductor device and/or microelectronic device, such as, for example, but not limited to, a semiconductor integrated circuit chip.

The term "coupled" as used herein refers to any connection, coupling, link, or the like by which signals carried by one system element are imparted to the "coupled" element. Such "coupled" devices, or signals and devices, are not necessarily directly connected to one another and may be separated by intermediate components or devices that may manipulate or modify such signals.

While the principles of the disclosure have been described herein, it is to be understood by those skilled in the art that this description is made only by way of example and not as a limitation as to the scope of the disclosure. Other permutations are contemplated within the scope of the present disclosure in addition to the exemplary aspects and examples shown and described herein. Modifications and substitutions by one of ordinary skill in the art are considered to be within the scope of the present disclosure, which is not to be limited except by the following claims.

The invention claimed is:

1. A system comprising:
a memory including an order book, the order book being associated with a first asset type and configured to store one or more orders for the first asset type;
a network interface circuit; and
at least one processor configured to:

receive, via the network interface circuit, a first request to execute a combo order transaction for a synthetic asset, the combo order transaction including a first leg associated with a first matching engine instance and a second leg with a second matching engine instance;

transition the order book to a locked state based on the received first request to execute the combo order transaction, the locked state preventing order processing unrelated to the combo order transaction;

identify at least one action to perform on the order book based on the received first request to execute the combo order transaction;

receive, via the network interface circuit, a ready to trade message from the first matching engine instance and/or the second matching engine instance; and in response to receiving the ready to trade message from the first matching engine instance and/or the second matching engine instance, perform the at least one action on the order book and transition the order book to an unlocked state.

2. The system of claim 1, wherein a maximum amount of time between transitioning the order book from the locked state to the unlocked state is in a range of 5 to 100 microseconds.

3. The system of claim 1, wherein the received ready to trade message is configured to indicate that the first matching engine instance and/or the second matching engine instance is in a synchronized state, the synchronized state including an order book associated with the first matching engine instance and/or the second matching engine instance being in a locked state.

4. The system of claim 1, wherein the at least one processor is configured to execute the first matching engine instance associated with the first leg of the combo order transaction, and wherein the combo order transaction is further associated with a third matching engine instance, the third matching engine instance having an order book to store orders for the synthetic asset, and wherein the at least one processor is further configured to receive, via the network interface circuit, the ready to trade message from the second matching engine instance and the third matching engine instance, and in response to receiving the ready to trade message from the second matching engine instance and third matching engine instance, perform the at least one action on the order book and transition the order book to an unlocked state.

5. The system of claim 1, wherein the first request includes a combo order identifier that uniquely identifies the combo order transaction across a plurality of matching engine instances including the first and second matching engine instances.

6. The system of claim 5, wherein the at least one processor is further configured to:

determine a first combo group identifier associated with the combo order identifier within the first request; and identify the first matching engine instance associated with the first leg and the second matching engine instance associated with the second leg based on the combo group identifier.

7. The system of claim 6, wherein the at least one processor is configured to identify the first matching engine instance associated with the first leg and the second matching engine instance associated with the second leg based on a lookup stored in the memory that associates an identifier of the first matching engine instance and an identifier of the second matching engine instance with the first combo group identifier.

8. The system of claim 7, wherein the lookup stored in the memory further associates the respective identifier of each the first and second matching engine instances with the first combo group identifier and with a respective role value.

9. The system of claim 8, wherein the at least one processor is configured to execute the first matching engine instance based on a matching engine instance definition stored in the memory, the matching engine instance definition including an assigned identifier set equal to the identifier of the first matching engine instance, and wherein the at least one processor is configured to identify the at least one action to perform on the order book during the combo order transaction based on the respective role value associated with the identifier of the first matching engine instance.

10. The system of claim 1, wherein the at least one processor is further configured to:

generate a provisional order in the memory based on the at least one identified action to perform on the order book, the provisional order being in an uncommitted state;

receive, via the network interface circuit, the ready to trade message from the first matching engine instance and the second matching engine instance, and wherein the at least one processor is configured to perform the at least one action on the order book based on receiving the ready to trade message from the first matching engine instance and the second matching engine instance while the order book is in the locked state, the at least one action including transitioning the provisional order in the memory to a committed state.

11. The system of claim 1, wherein the at least one processor is further configured to generate a provisional order in the memory based on the at least one identified action to perform on the order book, the provisional order being in an uncommitted state, and wherein the at least one processor is further configured to remove or invalidate the provisional order in the memory based on a predetermined amount of time elapsing after receiving the request to execute the combo order transaction.

12. The system of claim 11, wherein the predetermined amount of time is in a range of 5 to 100 microseconds.

13. The system of claim 1, wherein the at least one processor is further configured to receive a combo order group configuration file, the combo order group configuration file having a plurality of entries, each entry of the plurality of entries associating a combo order group identifier with an identifier of a matching engine instance associated with a first leg of a combo order transaction and an identifier of a matching engine instance associated with a second leg of the combo order transaction.

14. The system of claim 13, wherein the at least one processor is further configured to execute a third matching engine instance, the third matching engine instance having a corresponding identifier that uniquely identifies the third matching engine instance across a plurality of matching engine instances that includes the first matching engine instance and the second matching engine instance, and wherein the at least one processor is further configured to:

receive a second request to execute a combo order transaction for a synthetic asset, the second request including an identifier; and cause the third matching engine instance to ignore the second request based on a lookup in the memory that indicates the identifier within the second request to execute the combo order transaction is associated with a group of matching engine instances that does not include the third matching engine instance.

15. The system of claim 1, wherein the at least one processor is further configured to identify that the first asset type stored in the memory is associated with the first synthetic asset.

16. The system of claim 1, wherein the at least one processor is configured to execute the first matching engine instance that is associated with the first leg of the combo order transaction, and wherein the at least one processor is configured to identify the at least one action to perform on the order book based on a role value in the memory, the role value indicating that the first matching engine instance is to buy or sell a predetermined amount of the first asset type via one or more orders within the order book.

17. The system of claim 1, wherein the first request to execute the first combo order transaction includes a quantity value, and wherein the at least one processor is further configured to:

identify at least one order within the order book having a quantity equal to or greater than the quantity value of the combo order transaction; and send, via the network interface circuit, a ready to trade message to the first matching engine instance and the second matching engine instance.

18. The system of claim 1, wherein the at least one processor is further configured to send a ready to trade message to the first matching engine instance and a third matching engine instance, the third matching engine instance having an order book for the first synthetic asset type.

19. The system of claim 18, wherein the at least one processor is configured to send the ready to trade message as a multicast packet to an Internet Protocol (IP) multicast group, the IP multicast group being communicatively coupled to the first matching engine instance, the second matching engine instance, and the third matching engine instance.

20. The system of claim 1, wherein the at least one processor is configured to transition the order book to the locked state based on identifying an order within the order book that satisfies a leg of the combo order transaction.

21. The system of claim 1, wherein the at least one processor is further configured to output a trade complete message to the first matching engine instance and/or the second matching engine instance after performing the at least one action.

22. The system of claim 21, wherein the trade complete message is output as a packet to an Internet Protocol (IP) multicast group and/or a User Datagram Protocol (UDP) broadcast address.

23. The system of claim 1, wherein the request to execute the first combo order transaction is received by the at least one processor as a packet via a common communication channel, the common communication channel being communicatively coupled to the first matching engine instance, the second matching engine instance, and a third matching engine instance.

24. The system of claim 23, wherein the common communication channel is an Internet Protocol (IP) multicast group and/or a User Datagram Protocol (UDP) broadcast address.

25. The system of claim 1, wherein the request to execute the first combo order transaction is received by the at least one processor as a packet having an overall size in a range of 20 to 100 bytes.

26. The system of claim 1, wherein the first synthetic asset represents a combination of the first asset type and the second asset type, wherein the first asset type is associated with an order book of the first matching engine instance and the second asset type is associated with an order book of the second matching engine instance.

27. The system of claim 26, wherein the first and second asset types are a debt security, and wherein the first and second asset types have a different maturity period.

28. The system of claim 27, wherein the first and second asset types are benchmark government bonds.

29. The system of claim 27, wherein the request to execute the first combo order transaction for the first synthetic asset includes swapping, via the first and second legs, a target quantity of the first asset type for the second asset type or swapping a target quantity of the second asset type for the first asset type.

* * * * *